US009300946B2

(12) United States Patent
Do et al.

(10) Patent No.: US 9,300,946 B2
(45) Date of Patent: Mar. 29, 2016

(54) SYSTEM AND METHOD FOR GENERATING A DEPTH MAP AND FUSING IMAGES FROM A CAMERA ARRAY

(75) Inventors: Minh N. Do, Urbana, IL (US); Quang H. Nguyen, Ho Chi Minh (VN); Benjamin Chidester, Champaign, IL (US); Long Dang, Ho Chi Minh (VN); Sanjay J. Patel, Urbana, IL (US)

(73) Assignee: PERSONIFY, INC., Chicago, IL (US)

( * ) Notice: Subject to any disclaimer, the term of this patent is extended or adjusted under 35 U.S.C. 154(b) by 728 days.

(21) Appl. No.: 13/544,795

(22) Filed: Jul. 9, 2012

(65) Prior Publication Data

US 2013/0010073 A1    Jan. 10, 2013

Related U.S. Application Data

(60) Provisional application No. 61/505,837, filed on Jul. 8, 2011.

(51) Int. Cl.
*H04N 13/02* (2006.01)
*H04N 13/00* (2006.01)
*G03B 35/12* (2006.01)

(52) U.S. Cl.
CPC ....... *H04N 13/0214* (2013.01); *H04N 13/0217* (2013.01); *H04N 13/0257* (2013.01); *H04N 13/0271* (2013.01); *G03B 35/12* (2013.01); *H04N 2013/0081* (2013.01)

(58) Field of Classification Search
CPC .............. G03B 35/12; H04N 13/0214; H04N 13/0217; H04N 13/0257; H04N 13/0271; H04N 2013/0081
See application file for complete search history.

(56) References Cited

U.S. PATENT DOCUMENTS

| | | | |
|---|---|---|---|
| 5,043,922 A | 8/1991 | Matsumoto | |
| 5,239,624 A | 8/1993 | Cook et al. | |
| 5,363,475 A | 11/1994 | Baker et al. | |
| 5,377,313 A | 12/1994 | Scheibl | |
| 5,392,385 A | 2/1995 | Evangelisti et al. | |
| 5,561,752 A | 10/1996 | Jevans | |
| 5,563,989 A | 10/1996 | Billyard | |

(Continued)

OTHER PUBLICATIONS

Akbarzadeh, A., et al., "Towards Urban 3D Reconstruction From Video," Third International Symposium on 3D Data Processing, Visualization, and Transmission, pp. 1-8 (Jun. 14-16, 2006).

(Continued)

*Primary Examiner* — Sath V Perungavoor
*Assistant Examiner* — Peter D Le
(74) *Attorney, Agent, or Firm* — Invention Mine LLC

(57) ABSTRACT

A method, apparatus, system, and computer program product for of digital imaging. Multiple cameras comprising lenses and digital images sensors are used to capture multiple images of the same subject, and process the multiple images using difference information (e.g., an image disparity map, an image depth map, etc.). The processing commences by receiving a plurality of image pixels from at least one first image sensor, wherein the first image sensor captures a first image of a first color, receives a stereo image of the first color, and also receives other images of other colors. Having the stereo imagery, then constructing a disparity map and an associated depth map by searching for pixel correspondences between the first image and the stereo image. Using the constructed disparity map, captured images are converted into converted images, which are then combined with the first image, resulting in a fused multi-channel color image.

22 Claims, 18 Drawing Sheets

(56) References Cited

U.S. PATENT DOCUMENTS

| | | | |
|---|---|---|---|
| 5,586,234 A | 12/1996 | Sakuraba et al. | |
| 5,600,763 A | 2/1997 | Greene et al. | |
| 5,651,104 A | 7/1997 | Cosman | |
| 5,742,749 A | 4/1998 | Foran et al. | |
| 5,870,097 A | 2/1999 | Snyder et al. | |
| 5,914,721 A | 6/1999 | Lim | |
| 6,016,150 A | 1/2000 | Lengyel et al. | |
| 6,057,847 A | 5/2000 | Jenkins | |
| 6,072,496 A | 6/2000 | Guenter et al. | |
| 6,084,979 A | 7/2000 | Kanade et al. | |
| 6,111,582 A | 8/2000 | Jenkins | |
| 6,424,351 B1 | 7/2002 | Bishop et al. | |
| 6,445,815 B1 | 9/2002 | Sato | |
| 6,611,268 B1* | 8/2003 | Szeliski et al. | 345/473 |
| 6,671,399 B1* | 12/2003 | Berestov | 382/154 |
| 6,771,303 B2 | 8/2004 | Zhang et al. | |
| 6,865,289 B1* | 3/2005 | Berestov | 382/154 |
| 7,085,409 B2 | 8/2006 | Sawhney et al. | |
| 7,171,057 B1* | 1/2007 | Wilensky et al. | 382/284 |
| 7,221,366 B2 | 5/2007 | Uttendaele et al. | |
| 7,333,651 B1* | 2/2008 | Kim et al. | 382/154 |
| 7,471,292 B2 | 12/2008 | Li | |
| 7,532,230 B2 | 5/2009 | Culbertson et al. | |
| 8,069,190 B2 | 11/2011 | McColl et al. | |
| 8,351,685 B2 | 1/2013 | Ho et al. | |
| 8,395,642 B2 | 3/2013 | Yea et al. | |
| 8,447,096 B2 | 5/2013 | Klein Gunnewiek et al. | |
| 8,643,701 B2 | 2/2014 | Nguyen et al. | |
| 2003/0214502 A1 | 11/2003 | Park et al. | |
| 2003/0231179 A1 | 12/2003 | Suzuki | |
| 2005/0134699 A1* | 6/2005 | Nagashima et al. | 348/218.1 |
| 2006/0072851 A1 | 4/2006 | Kang et al. | |
| 2006/0098868 A1* | 5/2006 | Fainstain | G06T 3/4015 382/167 |
| 2006/0257042 A1* | 11/2006 | Ofek | G06T 5/005 382/255 |
| 2007/0159640 A1* | 7/2007 | Berestov | 356/611 |
| 2007/0248260 A1* | 10/2007 | Pockett | H04N 13/0022 382/154 |
| 2009/0016640 A1 | 1/2009 | Gunnewiek | |
| 2009/0115780 A1 | 5/2009 | Varekamp et al. | |
| 2010/0309292 A1 | 12/2010 | Ho et al. | |
| 2011/0025905 A1* | 2/2011 | Tanaka | 348/362 |
| 2011/0249889 A1* | 10/2011 | Kothandaraman | G06T 7/0026 382/154 |
| 2012/0044989 A1* | 2/2012 | Ahuja et al. | 375/240.03 |

OTHER PUBLICATIONS

Barnat, Jii'f, et al., "CUDA accelerated LTL Model Checking," FI MU Report Series, FIMU-RS-2009-05, 20 pages. (Jun. 2009).
Canesta™, "See How Canesta's Solution Gesture Control Will Change the Living Room," retrieved Oct. 21, 2010, from http://canesta.com, 2 pages.
Chan, S.C., et al., "Image-Based Rendering and Synthesis," IEEE Signal Processing Magazine, pp. 22-31 (Nov. 2007).
Chan, Shing-Chow, et al. "The Plenoptic Video," 15(12) IEEE Transactions on Circuits and Systems for Video Technology 1650-1659 (Dec. 2005).
Chen, Wan-Yu, et al., "Efficient Depth Image Based Rendering with Edge Dependent Depth Filter and Interpolation," IEEE International Conference on Multimedia and Expo, pp. 1314-1317 (Jul. 6, 2005).
Daribo, Ismael, et al., "Distance Dependent Depth Filtering in 3D Warping for 3DTV," IEEE 9th Workshop on Multimedia Signal Processing, pp. 312-315 (2007).
Debevec, Paul, et al., "Efficient View-Dependent Image-Based Rendering with Projective Texture-Mapping," In 9th Eurographics Workshop on Rendering, pp. 105-116 (Jun. 1998).
Diesel, James, et al., "An Application of Markov Random Fields to Range Sensing," In Advances in Neural Information Processing Systems, pp. 291-298 (2006).
Fern, Christoph, "Depth-Image-Based Rendering (DIBR), Compression and Transmission for a New Approach on 3D-TV," Proc. SPIE 5291, 93-104 (2004).
Fehn, Christoph, et al., "Interactive 3-DTV-Concepts and Key Technologies," 94(3) Proceedings of the IEEE 524-538 (Mar. 2006).
GPGPU (General-purpose computing on graphics processing units)—Wikipedia, retrieved Nov. 17, 2009, from http://en.wikipedia.org/wiki/GPGPU, 9 pages.
Ho, Yo-Sung, et al., "Three-dimensional Video Generation for Realistic Broadcasting Services," ITC-CSCC, pp. TR-1 through TR4 (2008).
Jung, KwangHee, et al., "Depth Image Based Rendering for 3D Data Service Over T-DMB," IEEE, 3DTV-CON'08, Istanbul, Turkey, pp. 237-240 (May 28-30, 2008).
Kanade, Takeo, et al., "Virtualized Reality: Constructing Virtual Worlds from Real Scenes," IEEE MultiMedia, pp. 34-46 (Jan.-Mar. 1997).
Kao, Wen-Chung, et al., "Multistage Bilateral Noise Filtering and Edge Detection for Color Image Enhancement," 51 (4) IEEE Transactions on Consumer Electronics 1346-1351 (Nov. 2005).
Kipfer, Peter, "GPU Gems 3—Chapter 33. LCP Algorithms for Collision Detection Using CUDA," retrieved Nov. 17, 2009, from http://http.developer.nvidia.com/GPUGems3/gpugems3_ch33.html, 11 pages. (2007).
Kubota, Akira, et al., "Multiview Imaging and 3DTV," IEEE Signal Processing Magazine, pp. 10-21 (Nov. 2007).
Lee, Eun-Kyung, et al., "High-Resolution Depth Map Generation By Applying Stereo Matching Based on Initial Depth Information," 3DTV-CON'08, Istanbul, Turkey, pp. 201-204 (May 28-30, 2008).
Mark, William R., et al., "Post-Rendering 3D Warping," In Proceedings of 1997 Symposium on Interactive 3D Graphics, Providence, RI, pp. 7-16 (Apr. 27-30, 1997).
McMillan, Jr., Leonard, "An Image-Based Approach to Three-Dimensional Computer Graphics," University of North Carolina at Chapel Hill, Chapel Hill, NC, 206 pages. (1997).
Nguyen, Ha T., et al., "Image-Based Rendering with Depth Information Using the Propagation Algorithm," Proc. of IEEE International Conference on Acoustics, Speech, and Signal Processing (ICASSP), 4 pages. (Mar. 2005).
Nguyen, Quang H., et al., "Depth image-based rendering from multiple cameras with 3D propagation algorithm," Proceedings of the 2nd International Conference on Immersive Telecommunications, 6 pages. (2009).
Nguyen, Quang H., et al., "Depth Image-Based Rendering with Low Resolution Depth," 16th IEEE International Conference on Image Processing (ICIP), pp. 553-556 (2009).
PrimeSense, Home Page, retrieved Oct. 21, 2010, from http://www.primesense.com, 1 page.
Saxena, Ashutosh, et al., "3-D Depth Reconstruction from a Single Still Image," 76(1) International Journal of Computer Vision 53-69 (2007).
Shade, Jonathan, et al., "Layered Depth Images," Computer Graphics Proceedings, Annual Conference Series, pp. 231-242 (Jul. 19-24, 1998).
Shum, Heung-Yeung, et al., "A Review of Image-based Rendering Techniques," IEEE/SPIE Visual Communications and Image Processing (VCIP), pp. 1-12 (Jun. 2000).
Tomasi, C., et al., "Bilateral Filtering for Gray and Color Images," Sixth International Conference on Computer Vision, pp. 839-846 (1998).
Um, Gi-Mun, et al., "Three-dimensional Scene Reconstruction Using Multi-view Images and Depth Camera," SPIE-IS&T/ vol. 5664, pp. 271-280 (2005).
Vazquez, C., et al., "3D-TV: Coding of Disocclusions for 2D+Depth Representation of Multi-View Images," Proceedings of the Tenth IASTED Int'l Conference: Computer Graphics and Imaging, pp. 26-33 (Feb. 13-15, 2008).
Yang, Qingxiong, et al., "Spatial-Depth Super Resolution for Range Images," IEEE Conference on Computer Vision and Pattern Recognition, pp. 1-8 (2007).
Zhang, Buyue, et al., "Adaptive Bilateral Filter for Sharpness Enhancement and Noise Removal," IEEE ICIP, pp. IV-417-IV-420 (2007).
Zhang, Cha, et al., "A Survey on Image-Based Rendering—Representation, Sampling and Compression," Technical Report AMP

(56) References Cited

OTHER PUBLICATIONS 03-03, Electrical and Computer Engineering, Carnegie Mellon University, Pittsburgh, PA, pp. 1-45 (Jun. 2003).

Zitnick, C. Lawrence, et al., "High-quality video view interpolation using a layered representation," 23(3) Journal ACM Transactions on Graphics (TOG)—Proceedings of ACM SIGGRAPH 2004, pp. 600-608 (Aug. 2004).

* cited by examiner

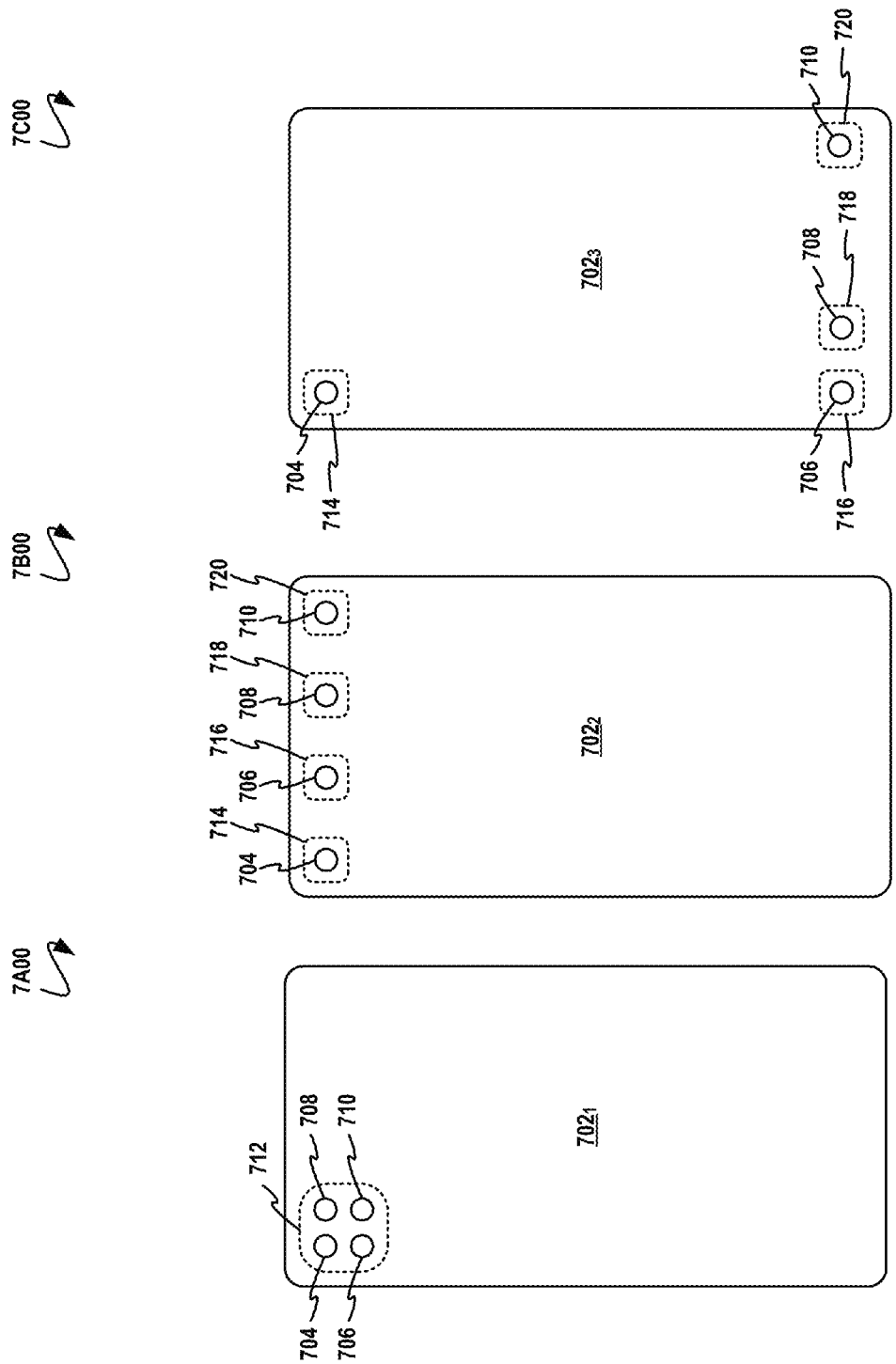

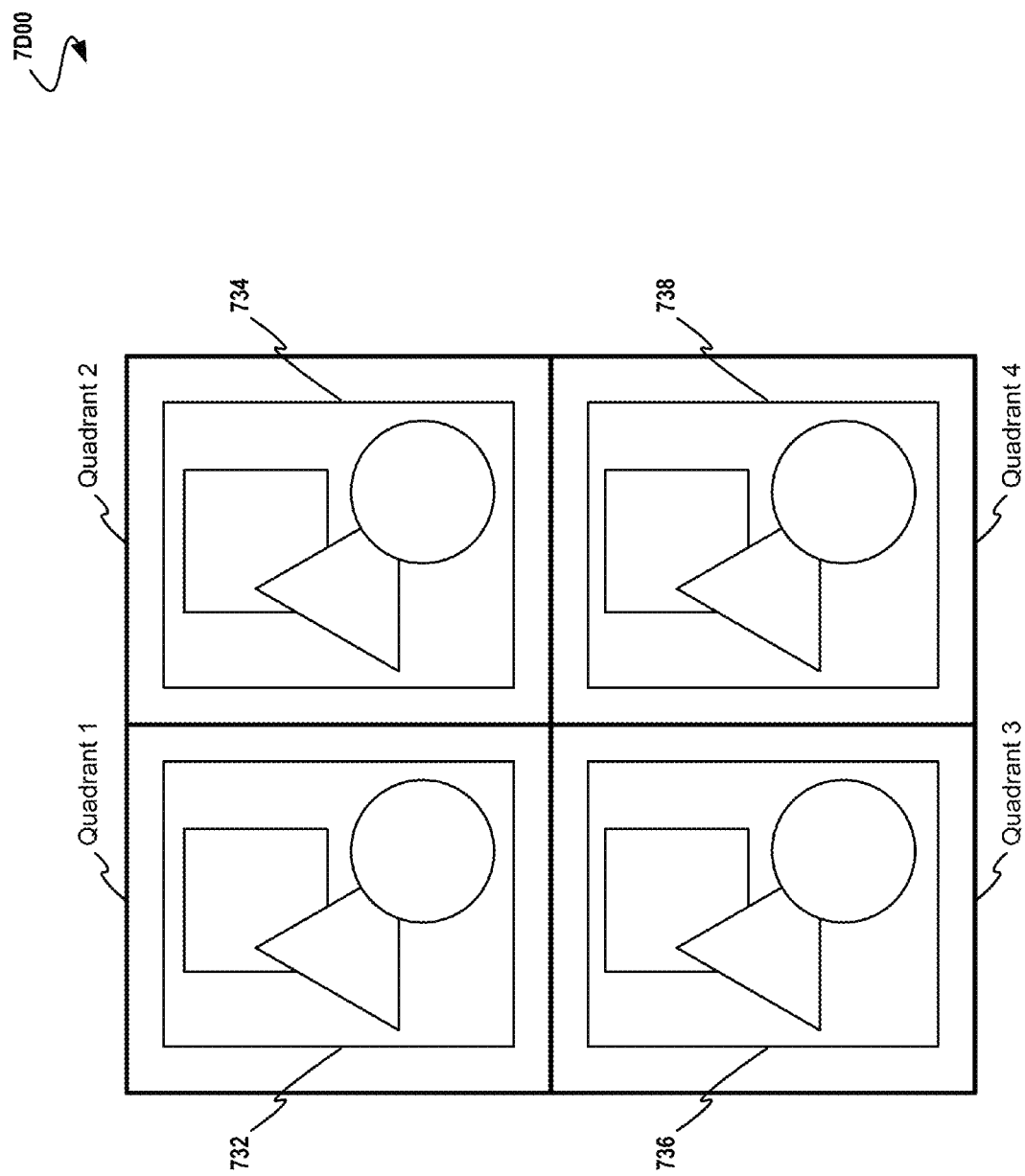

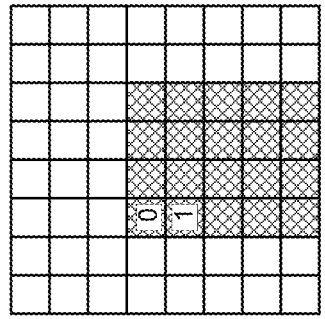
FIG. 11B
Disparity $d_v$
 = Disoccluded Area
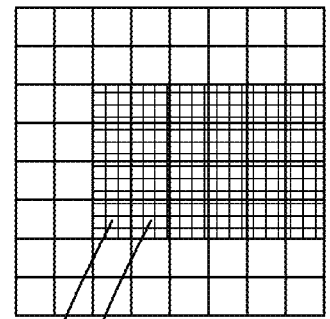
FIG. 11C
Red Subimage R3
a3 1110
b3 1112
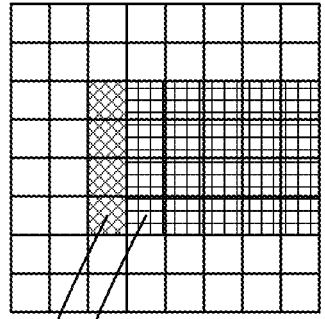
FIG. 11A
Warped Red Subimage R1
a1 1102
b1 1104

SYSTEM AND METHOD FOR GENERATING A DEPTH MAP AND FUSING IMAGES FROM A CAMERA ARRAY

RELATED APPLICATIONS

The present application claims the benefit of priority to U.S. Patent Application Ser. No. 61/505,837, entitled "SYSTEM AND METHOD FOR FUSING IMAGES FROM A CAMERA ARRAY"; filed Jul. 8, 2011, which is hereby incorporated by reference in its entirety.

FIELD

The disclosure relates to the field of digital imaging and more particularly to techniques for fusing images from a camera array.

BACKGROUND

Some embodiments of the present disclosure are directed to an improved approach for implementing fusing images from a camera array.

Mobile telephones with built-in cameras are becoming ubiquitous. Most mobile telephones produced today include cameras suitable for capturing photographs or video. Moreover, as the sophistication of mobile telephones has evolved, so too have the capabilities of mobile phone cameras. Whereas early mobile phone cameras could only capture images with VGA resolution or very low pixel counts, newer mobile phones include cameras with megapixel levels that rival those of stand-alone cameras. Thus, cameras have become a very important component of modern mobile phones.

However, the fast pace of innovation in the consumer electronics sector has driven a near-constant demand for mobile phones that are faster and more sophisticated yet smaller and lighter. These pressures have pushed the limits of engineers' abilities to design mobile phone cameras that boast a higher resolution but do not add excessive bulk to the device. Because cameras require certain mechanical components to function, there are physical constraints that limit the extent to which the size of a camera can be reduced without sacrificing image quality.

Moreover, the aforementioned technologies do not have the capabilities to perform fusing images from a camera array. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for fusing images from a camera array.

Certain embodiments disclosed herein relate to a system and method for correlating and combining multiple images taken using camera lenses that are arranged in an array. As disclosed herein the lenses correspond to different color channels (such as red, green, blue, etc.) that are fused into a multiple-channel image (e.g., an RGB color image).

A method, apparatus, system, and computer program product for of digital imaging. System embodiments use multiple cameras comprising lenses and digital images sensors to capture multiple images of the same subject, and process the multiple images using difference information (e.g., an image disparity map, an image depth map, etc.). The processing commences by receiving a plurality of image pixels from at least one first image sensor, wherein the first image sensor captures a first image of a first color, receives a stereo image of the first color, and also receives other images of other colors. Having the stereo imagery, then, constructing a disparity map by searching for pixel correspondences between the first image and the stereo image. Using the constructed disparity map, which is related to the depth map, the second and other images are converted into converted images, which are then combined with the first image, resulting in a fused multi-channel color image.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 7A shows an apparatus having a four-camera mapping in an array over a single image sensor used in fusing images from a camera array, according to some embodiments.

FIG. 7B shows an apparatus having a four-camera mapping in a linear array over four image sensors used in fusing images from a camera array, according to some embodiments.

FIG. 7C shows an apparatus having a four-camera mapping in a floating array over four image sensors used in fusing images from a camera array, according to some embodiments.

FIG. 7D shows an array of image sensor areas arranged for rectification as used in systems for fusing images from a camera array, according to some embodiments.

FIG. 11A, FIG. 11B, and FIG. 11C depict respective images used in a process for removing warp from a warped red subimage using a disparity image to produce an unwarped subimage, according to some embodiments.

DETAILED DESCRIPTION

Some embodiments of the present disclosure are directed to an improved approach for implementing fusing images from a camera array. More particularly, disclosed herein are environments, methods, and systems for implementing fusing images from a camera array.

Definitions

The term "image sensor" or "image sensors" refers to one or a plurality of pixelated light sensors located in proximity to a focal plane of one or more camera lenses. One example is a CCD device. An image sensor as used herein can sense light variations in terms of luminance (brightness) and in terms of color (wavelength).

The term "stereo" or "stereo images" refers to at least two images of the same subject where the vantage points of the at least two respective images are separated by a distance.

The term "logic" means any combination of software and hardware that is used to implement all or part of the disclosure.

The term "non-transitory computer readable medium" refers to any medium that participates in providing instructions to a logic processor.

A "module" includes any mix of any portions of computer memory and any extent of circuitry including circuitry embodied as a processor.

Reference is now made in detail to certain embodiments. The disclosed embodiments are not intended to be limiting of the claims.

Overview

Cameras comprising arrays of multiple lenses are disclosed herein, and are configured to support image processing so as to address the constraints as discussed in the foregoing. In such systems as are herein disclosed, instead of using a single lens to image the scene as in conventional cameras, a camera array with multiple lenses (also referred to as a lenslet camera) is used. Because imaging is distributed through multiple lenses of smaller size, the distance between the lenses and the sensor, or camera height, can be significantly reduced.

Yet, the individual subject images as each captured through multiple lenses of smaller size need to be processed and combined to as to produce a combined image that has been processed to correct at least the pixel-wise spatial disparity introduced by the effects of the juxtaposition of the multiple lenses. That is, if the multiple lenses are organized into a linear horizontal array, the spatial disparity introduced by the effects of the horizontal juxtaposition of the multiple lenses needs to be corrected in a composite image. Or, if the multiple lenses are organized into a linear vertical array, the spatial disparity introduced by the effects of the vertical juxtaposition of the multiple lenses needs to be corrected.

Further details regarding a general approach to image synthesis from an array of cameras are described in U.S. Publication No. US 2011/0115886 A1 "A System for Executing 3D Propagation for Depth Image-Based Rendering", which is hereby incorporated by reference in their entirety.

Descriptions Of Exemplary Embodiments

Figure 1:
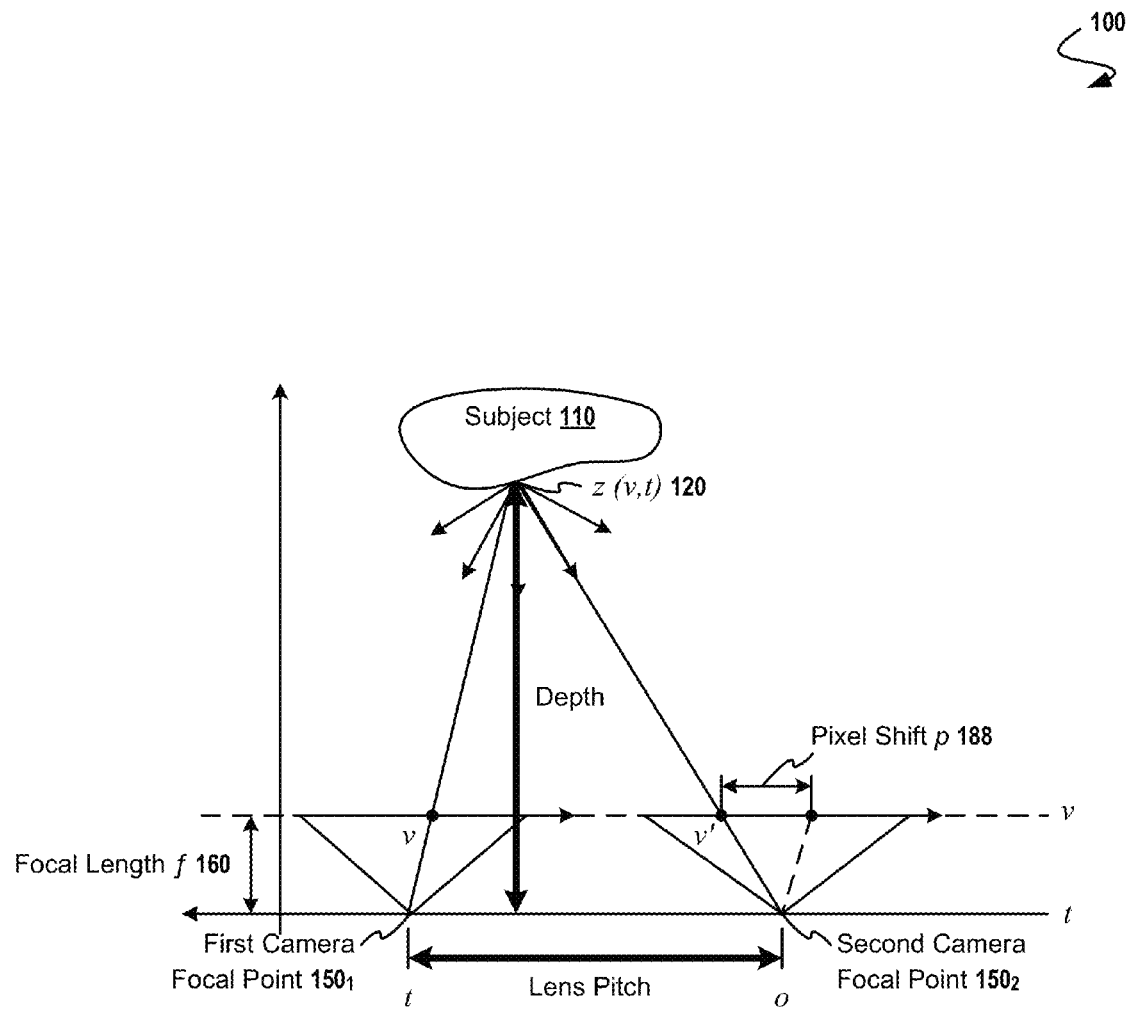
FIG. 1 is a pixel shift diagram for use in implementing techniques for fusing images from a camera array, according to some embodiments.

FIG. 1 is a pixel shift diagram 100 for use in implementing techniques for fusing images from a camera array. As an option, the present pixel shift diagram 100 may be implemented in the context of the architecture and functionality of the embodiments described herein. Also, the pixel shift diagram 100 or any aspect therein may be implemented in any desired environment.

Because these multiple images are captured using lenses located at different points along a plane, such an image fusion system needs to correct for the parallax effect. The parallax effect refers to the variance in the relative apparent position of objects depending on the observation position. FIG. 1 illustrates the parallax effect on two images of the same scene captured by two different cameras.

More precisely, let's consider two cameras that are rectified: they are placed along a horizontal line as depicted in FIG. 1. Consider two corresponding lines from the two captured images of subject 110. In this situation, the same point with depth z in the scene would be imaged as pixel v on the first camera focal point 150$_1$ and v' on the second camera focal point 150$_2$. The relative number of pixel shifts (also referred to herein as "disparity") $\Delta v = v - v'$ between v and v' can be derived as:

$$\Delta v = \frac{f * t}{z * p} \qquad \text{Equation (1)}$$

where:

f is the camera focal length 160, t is the distance between two cameras, z is the depth of the imaging point 120, and p is the pixel pitch 188 (distance between consecutive pixels in each camera).

Note that the parallax amount $\Delta v$ depends on the depth z of the imaging object in 3D. Thus, accurate image fusion for a camera array can estimate and rely on this depth information. For instance, consider an exemplary embodiment with a focal length of 2 mm, a pixel pitch of 1.75 μm, and a distance between lenses of 1.75 mm.

Table 1 illustrates the parallax effect for a camera array with the above features determined according to equation (1).

TABLE 1

Table Title

| Depth | Parallax (number of pixel shifts) |
|---|---|
| 0.25 m | 8 |
| 0.5 m | 4 |
| 1 m | 2 |
| 2 m | 1 |
| >4 m | <½ (can be ignored) |

The embodiments disclosed herein comprise an efficient system and method for generating a fused color image from multiple images captured by a camera array. In addition, the system and method also generate a depth map of the captured scene. In some of the exemplary embodiments a non-limiting aspect of a two-by-two camera array is described.

Figure 2:
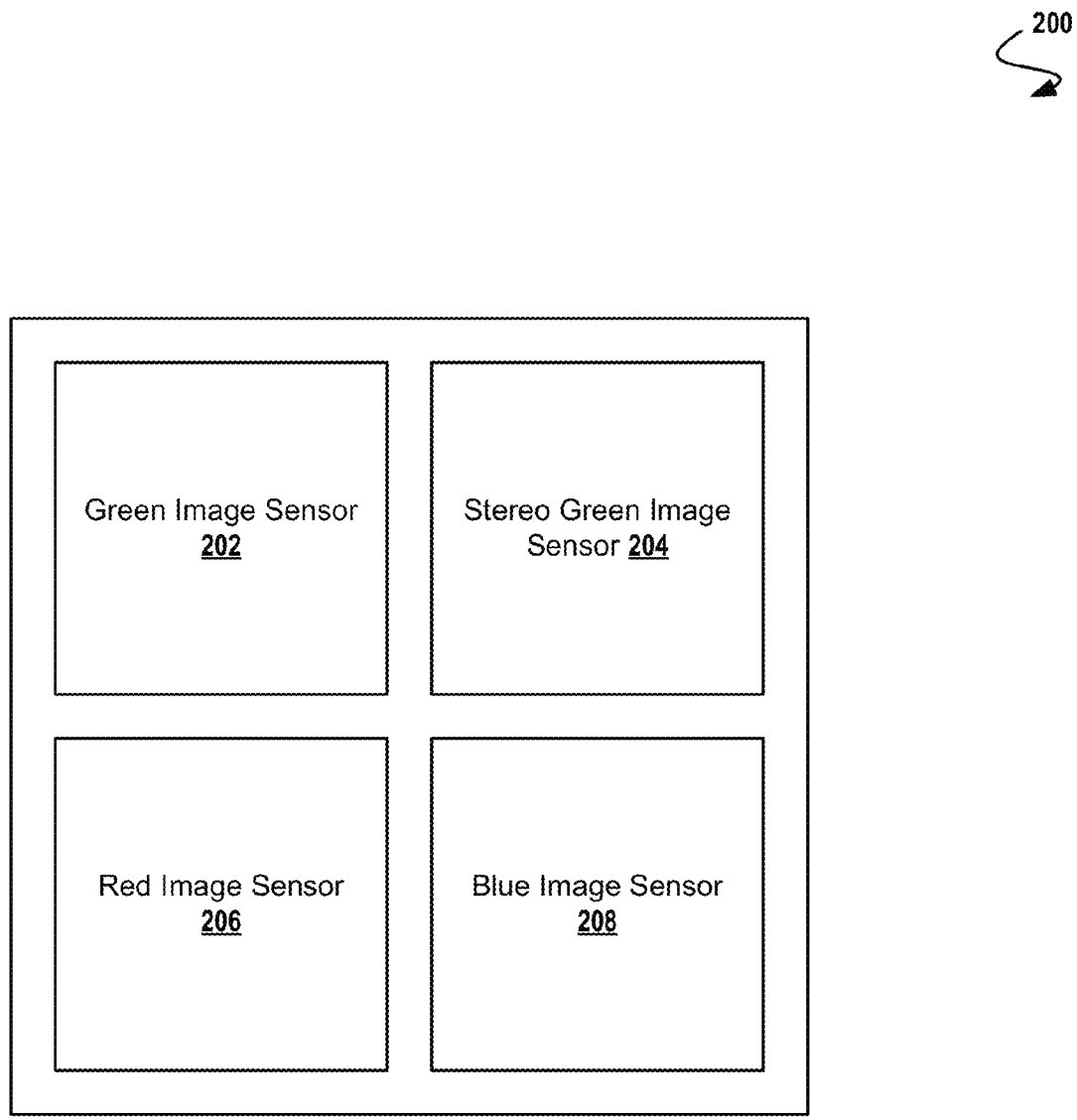
FIG. 2 is a simplified diagram of an RGB camera array used in apparatus for fusing images from a camera array, according to some embodiments.

FIG. 2 is a simplified diagram of an RGB camera array 200 used in apparatus for fusing images from a camera array. As an option, the present RGB camera array 200 may be implemented in the context of the architecture and functionality of the embodiments described herein. Also, the RGB camera array 200 or any aspect therein may be implemented in any desired environment.

As shown, FIG. 2 depicts an RGB camera array in the configuration of a two-by-two camera array arrangement. The aforementioned 'R', 'G', 'B' corresponds to color channels (e.g., red channel, green channel, and blue channel) of a color image. FIG. 2 illustrates an exemplary camera array comprising multiple image sensors (e.g., green image sensor 202, red image sensor 206, blue image sensor 208, etc.) used for capturing the images that are fused according to the procedure recited herein. According to an embodiment, each image sensors captures a distinct image corresponding to one of the red, green, and blue color channels (or, cyan, yellow, magenta color channels). As is customary in the art, the images may comprise pixels arranged in a grid-like pattern, where each continuous horizontal (or vertical) array of pixels comprises a scanline.

The aforementioned color channels can be configured in alternate colors or combinations of colors. For example, color channels can be formed using one or more magenta lenses, one or more cyan lenses, and one or more yellow lenses. Or, color channels can be formed using one or more red lenses, one or more cyan lenses, and one or more blue lenses. Still more, some embodiments substitute one color for another color. For example, green image sensor 202 is replaced by a red image sensor, the stereo green image sensor 204 is replaced by a stereo red image sensor, the red image sensor 206 is replaced by a blue image sensor, and the blue image sensor 208 is replaced by a green image sensor).

In this two-by-two RGB camera array using four image sensors, three image sensors correspond to the color channels 'R', 'G', and 'B', and the remaining image sensor is a stereo image sensor (as shown the stereo green image sensor 204).

Image Fusion Overview

In exemplary embodiments using a two-by-two RGB camera array having four image sensors, a disparity map [referred to as Δv in equation (1) or parallax in FIG. 2] is constructed by searching for correspondences in each pair of adjacent scanlines of the two top green images (namely green image sensor 202 and stereo green image sensor 204). A correspondence comprises a pair of pixels in two images that correspond to the same point in space. In this particular embodiment, since these two images are rectified, the search can be done efficiently line-by-line; matches may be found using non-iterative matching techniques, and as in this embodiment, the two images used to construct the disparity map are of the same color component (in this case green). Also, in some cases, a search range as may be used in matching techniques can be restricted based in specific camera parameters (e.g., depth range). For example, using the parameter from FIG. 2 and assuming depth is at least 0.25 m, the matching technique only needs to search for four pixels on the left and four pixels on the right for correspondences.

Using the constructed disparity map $\Delta v_x$ and equation (1), processing steps map each pixel from the red and blue images (namely from red image sensor 206 and blue image sensor 208) into a correct corresponding position with respect to the image from green image sensor 202. More specifically, let $t_x$ be the distance between camera centers horizontally and $t_y$ be the distance between camera centers vertically in the camera array.

Then the vertical disparity $\Delta v_y$ is obtained from the horizontal $\Delta v_x$ disparity as:

$$\Delta v_y = \Delta v_x \frac{t_y}{t_x} \qquad \text{Equation (2)}$$

Then, using the disparity map on the red and blue channels results in disparity corrected images for the red and blue channels with respect to the green channel. Combining the disparity corrected images for the red and blue channels plus the green channel results in the desired fused color image. Some additional post-processing steps, such as inpainting or bilateral filtering, can be applied to compensate for any visual artifacts in the fused image.

The foregoing is but one embodiment. Other embodiments use the disparity map Δv and equation (1) in combination with various camera parameters (e.g., focal length f, distance between lenses t, and pixel pitch p) that generate a depth map having a z value per each pixel.

Figure 3:
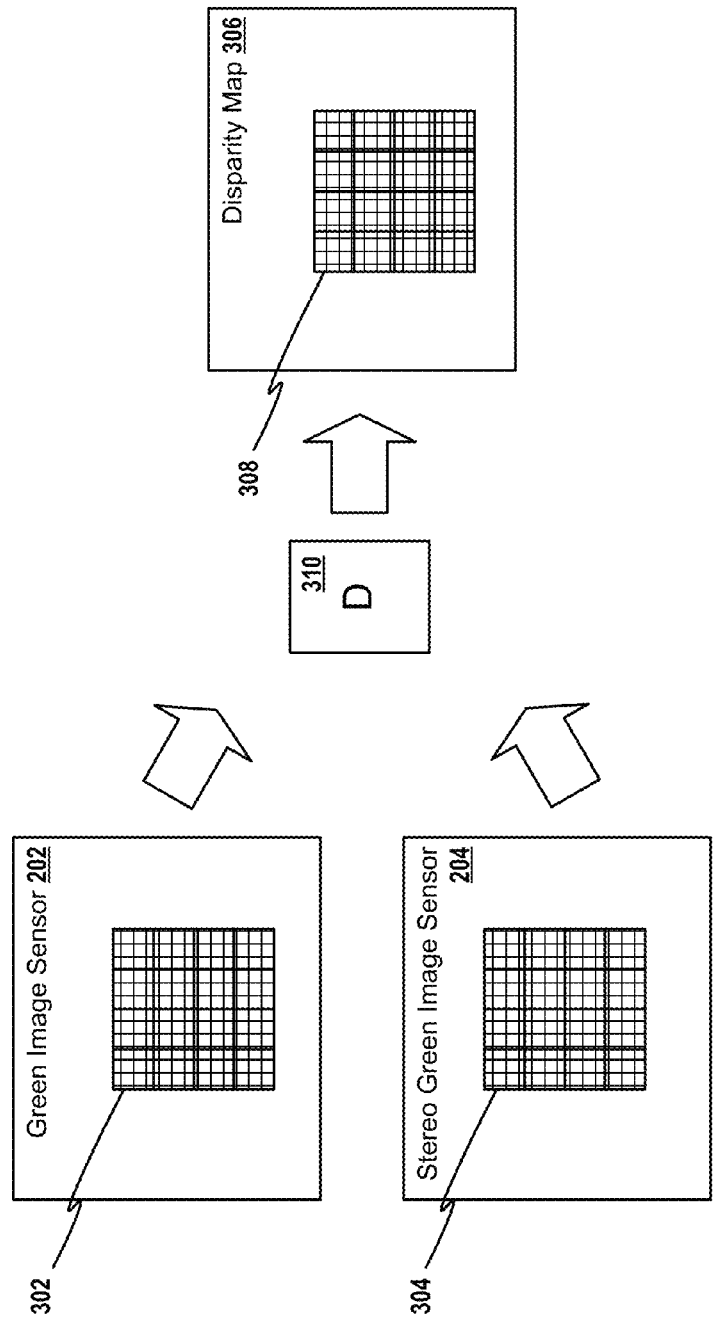
FIG. 3 shows a horizontal disparity mapping process used in techniques for fusing images from a camera array, according to some embodiments.

FIG. 3 shows a horizontal disparity mapping process 300 used in techniques for fusing images from a camera array. As an option, the present horizontal disparity mapping process 300 may be implemented in the context of the architecture and functionality of the embodiments described herein. Also, the horizontal disparity mapping process 300 or any aspect therein may be implemented in any desired environment.

As shown a green image sensor 202 and a stereo green image sensor 204 are used to construct a disparity map 306. The shown technique can be used in fusing a plurality of images from a camera array. In the data flow as shown, a function D 310 serves to receive image pixels from a first image sensor 302, where the first image sensor captures a first image via the green channel, and further, the function D 310 serves to receive image pixels from a stereo image sensor 304 (also via the green channel). The images received differ at least in the aspect that the vantage point of the lenses differs by a horizontal distance.

Then, the function D 310 serves to construct a disparity map 306 using the aforementioned arrays of image pixels by searching for pixel correspondences between the image pixels from the first image sensor 302 and the image pixels of the stereo image sensor 304. In certain situations, a disparity map 306 can be viewed as a disparity map image 308.

Figure 4:
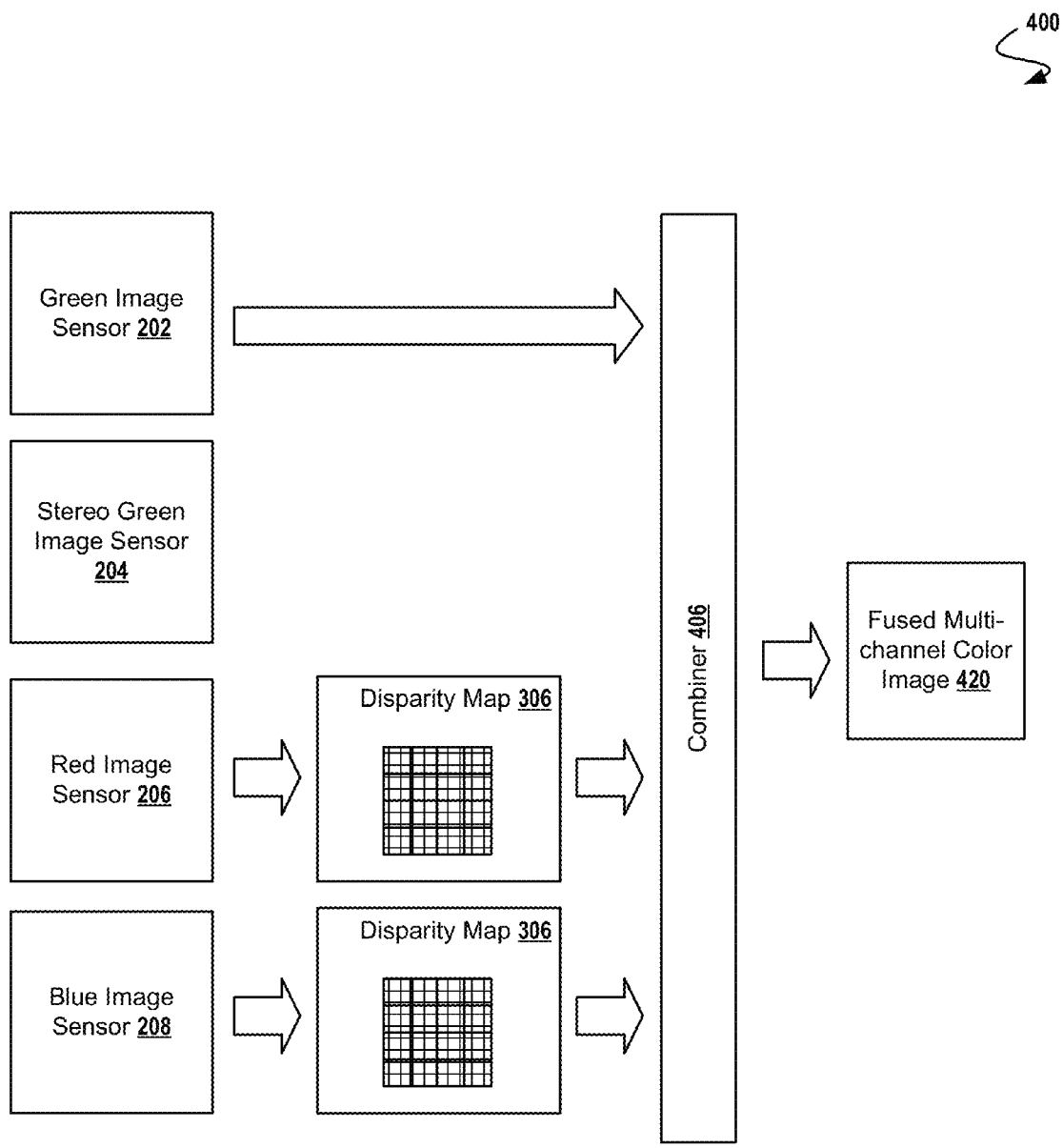
FIG. 4 shows a horizontal disparity correction process used in techniques for fusing images from a camera array, according to some embodiments.

FIG. 4 shows a horizontal disparity correction process 400 used in techniques for fusing images from a camera array. As an option, the present horizontal disparity correction process 400 may be implemented in the context of the architecture and functionality of the embodiments described herein. Also, the horizontal disparity correction process 400 or any aspect therein may be implemented in any desired environment.

As shown, the disparity map 306 is used in converting the images from multiple image sensors (e.g., green image sensor 202, stereo green image sensor 204, red image sensor 206, blue image sensor 208, etc.). Such a conversion adjusts for at least some of the differences (e.g., parallax differences) between the images captured by the image sensors (e.g., the image captured by the red image sensor 206, the image captured by the blue image sensor 208). Having adjusted the images from the three color channels to simulate the same vantage point, a combiner 406 serves to combine the original image (e.g., from green image sensor 202), and adjusted images (e.g., from image sensor 206, and from image sensor 208, etc.) into a fused multi-channel color image 420.

Figure 5:
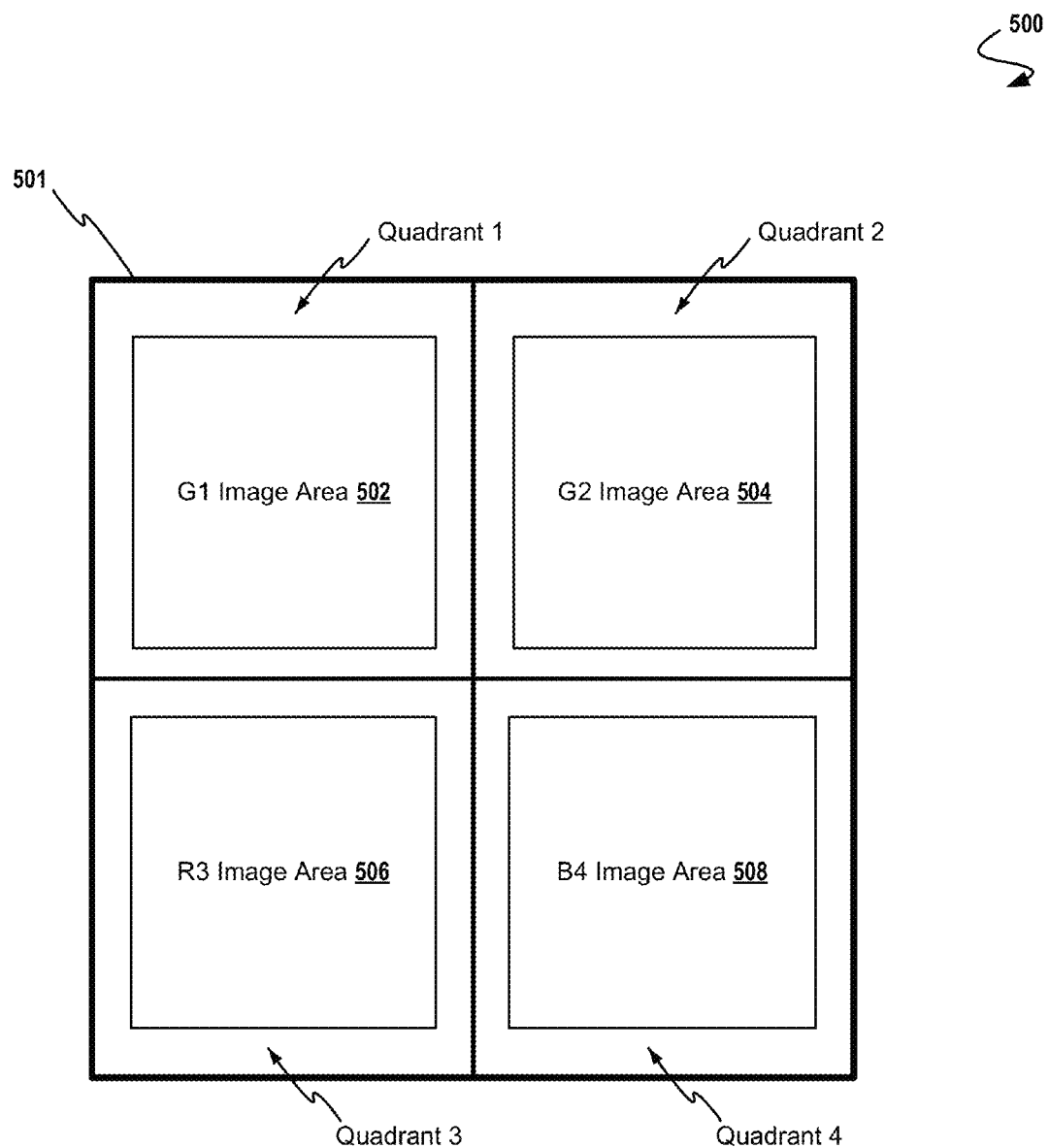
FIG. 5 shows a camera mapping in an array over a single image sensor used in fusing images from a camera array, according to some embodiments.

FIG. 5 shows a camera mapping 500 in an array over a single image sensor used in fusing images from a camera array. As an option, the present camera mapping 500 may be implemented in the context of the architecture and functionality of the embodiments described herein. Also, the camera mapping 500 or any aspect therein may be implemented in any desired environment.

As shown, the camera mapping 500 includes four subimage areas (e.g., G1 image area 502, G2 image area 504, R3 image area 506, and B4 image area 508) that are juxtaposed within the area of a single image sensor 501. In the example shown, the area of the single image sensor 501 is divided into four quadrants, and each different image area is assigned to a particular quadrant.

The shown camera mapping 500 is purely exemplary, and two or more image areas can be assigned to two or more image sensors. For example, rather than assigning four images to the four quadrants of a single large square image sensor (as shown) some embodiments assign each different image to a different smaller image sensor. Other combinations are disclosed infra.

Figure 6:
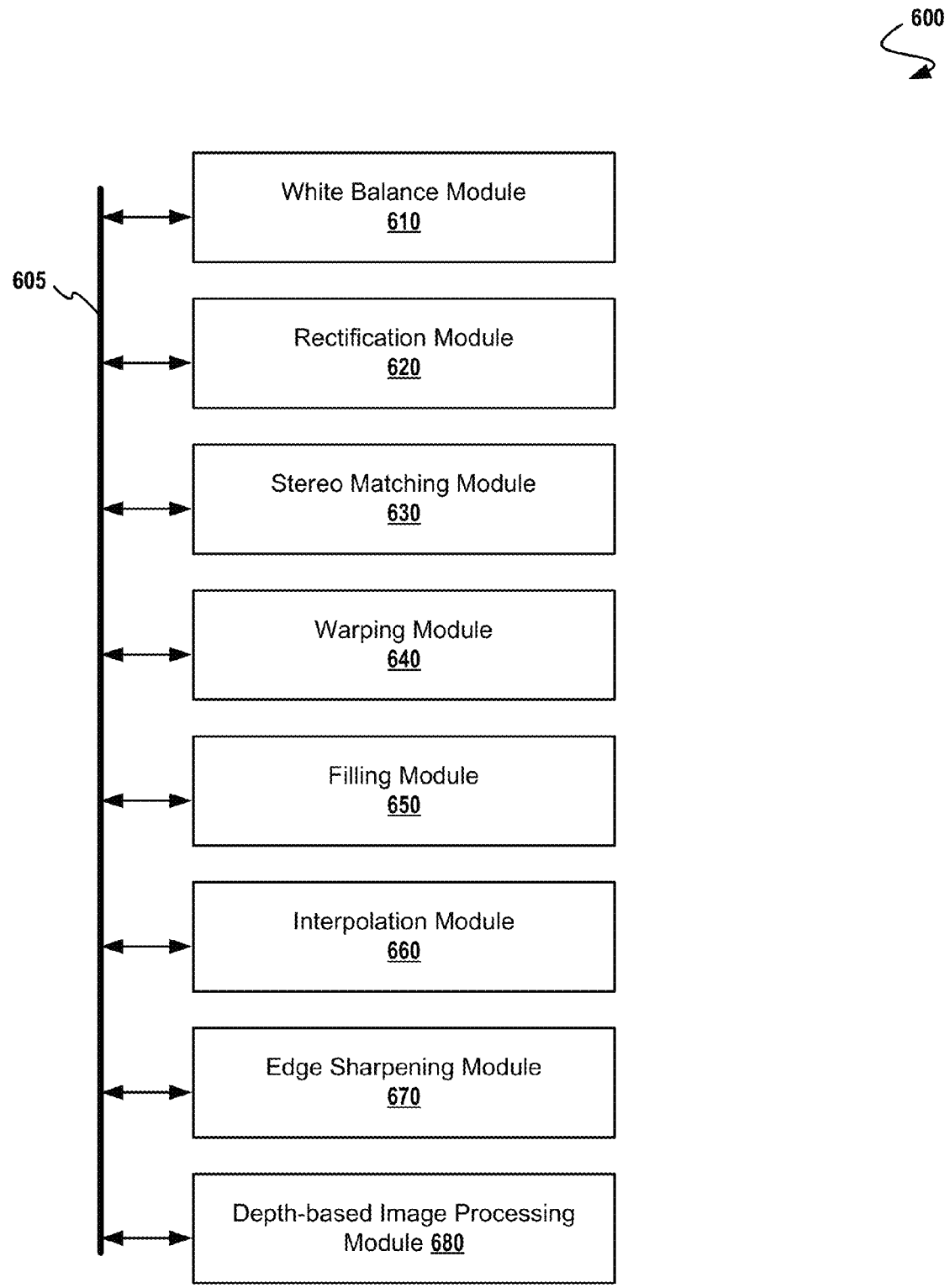
FIG. 6 depicts a system for processing images when fusing images from a camera array, according to some embodiments.

FIG. 6 depicts a system 600 for processing images when fusing images from a camera array. As an option, the present system 600 may be implemented in the context of the architecture and functionality of the embodiments described herein. Also, the system 600 or any aspect therein may be implemented in any desired environment.

As earlier indicated, additional post-processing steps such as inpainting or bilateral filtering can be applied to compensate for any visual artifacts in the fused image. However, the specific examples of inpainting and bilateral filtering are merely two image processing techniques that can be applied to compensate for any visual artifacts in the fused image.

In some embodiments, different and/or additional image processing techniques are applied, and in some embodiments, certain pre-processing steps in addition to or instead of post-processing steps serve to enhance the performance and/or results of application of the aforementioned additional image processing techniques. For example, one possible image processing flow comprises operations for:

white balance
rectification
stereo matching
warping
filling
interpolation
edge sharpening
depth-based image processing Various systems comprising one or more components can use any one or more of the image processing techniques of system 600. Moreover any module (e.g., white balance module 610, rectification module 620, stereo matching module 630, warping module 640, filling module 650, interpolation module 660, edge sharpening module 670, depth-based image processing module 680, etc.) can communicate with any other module over bus 605.

FIG. 7A shows an apparatus having a four-camera mapping 7A00 in an array over a single image sensor used in fusing images from a camera array. As an option, the present four-camera mapping 7A00 may be implemented in the context of the architecture and functionality of the embodiments described herein. Also, the four camera mapping 7A00 or any aspect therein may be implemented in any desired environment.

As shown, an apparatus (e.g., apparatus $702_1$) serves to provide a mechanical mounting for multiple lenses (e.g., lens 704, lens 706, lens 708, and lens 710). Also shown is a single image sensor 712. In this juxtaposition, each of the lenses is disposed over the single image sensor 712 such that the image from one of the lenses excites a respective quadrant of the single image sensor 712. Other juxtapositions are possible, and are now briefly discussed.

FIG. 7B shows an apparatus having a four-camera mapping 7B00 in a linear array over four image sensors used in fusing images from a camera array. As an option, the present four-camera mapping 7B00 may be implemented in the context of the architecture and functionality of the embodiments described herein. Also, the four camera mapping 7B00 or any aspect therein may be implemented in any desired environment.

As shown, an apparatus (e.g., apparatus $702_2$) serves to provide a mechanical mounting for multiple lenses (e.g., lens 704, lens 706, lens 708, and lens 710). In this juxtaposition, each of the lenses is disposed over a respective image sensor such that the image from one of the lenses excites a respective image sensor. For example, lens 704 is disposed over its respective image sensor 714, and lens 706 is disposed over its respective image sensor 716, etc. Other juxtapositions are possible, and are now briefly discussed.

FIG. 7C shows an apparatus having a four-camera mapping 7C00 in a floating array over four image sensors used in fusing images from a camera array. As an option, the present four-camera mapping 7C00 may be implemented in the context of the architecture and functionality of the embodiments described herein. Also, the four camera mapping 7C00 or any aspect therein may be implemented in any desired environment.

As shown, an apparatus (e.g., apparatus $702_3$) serves to provide a mechanical mounting for multiple lenses (e.g., lens 704, lens 706, lens 708, and lens 710). In this juxtaposition, each of the lenses is disposed over a respective image sensor such that the image from one of the lenses excites a respective image sensor. For example, lens 704 is disposed over its respective image sensor 714, and lens 706 is disposed over its respective image sensor 716, lens 708 is disposed over its respective image sensor 718, lens 710 is disposed over its respective image sensor 720, etc. This embodiment differs from the embodiment of the four-camera mapping 7B00 in at least the aspect that not all of the lenses are organized in a linear array.

FIG. 7D shows an array of image sensor areas 7D00 arranged for rectification as used in systems for fusing images from a camera array. As an option, the present array of image sensor areas 7D00 may be implemented in the context of the architecture and functionality of the embodiments described herein. Also, the array of image sensor areas 7D00 or any aspect therein may be implemented in any desired environment.

As shown, the lenses are arranged strictly within a Cartesian coordinate system. This arrangement is merely exemplary, yet it serves as an illustrative example, since the rectangular arrangement makes for a simpler discussion of the mathematics involved in rectification, which discussion now follows.

Rectification as used herein is an image processing technique used to transform an input subimage such that the pixels of the input subimage map to a reference coordinate system. For example rectification transforms an input subimage such that the input subimage maps to a reference coordinate system in both the horizontal and vertical dimensions. This can be done for multiple subimages such that (for example) the green reference subimage 732, the green stereo subimage 734, the red subimage 736, and the blue subimage 738 map onto the green reference subimage 732, thus rectifying a given set of subimages onto a common image plane. As is presently discussed, when using an arrangement in a Cartesian coordinate system where a first image and its stereo image are transverse in only one dimension (e.g., a horizontal dimension) the search for pixel correspondences between the stereo pair is simplified to one dimension, namely the dimension defined by a line segment parallel to a line bisecting the cameras.

Some of the disclosed rectification algorithms take advantage that the multiple lenses in the array (e.g., a 2×2 Cartesian array, or a 1×4 linear array) are positioned firmly within a mechanical mounting and are positioned precisely in a rectangular grid. Each lens could have a lens distortion that can be calibrated against a known test pattern and the calibration points stored for later retrieval.

Other camera-specific parameters include the location of the principle point of one of the lenses (say G1) and the rotation angle of the lens grid with respect to the image sensor. Such parameters can be obtained during the camera assembly process and stored in the ROM (read-only-memory) of the camera (see FIG. 15).

Given the above camera parameters and characteristics of the mechanical mounting, the locations of the principle points of the remaining lenses as well as their rotation angles with respect to the image sensor can be calculated. Based on these parameters exemplary embodiments apply a rectification transformation to acquired subimages (e.g., G1, G2, R3, and B4 of FIG. 5), which rectification transformation results in rectified images such that corresponding rows and columns of pixels are aligned in both a horizontal dimension and in a vertical dimension pairs of subimages.

Figure 8:
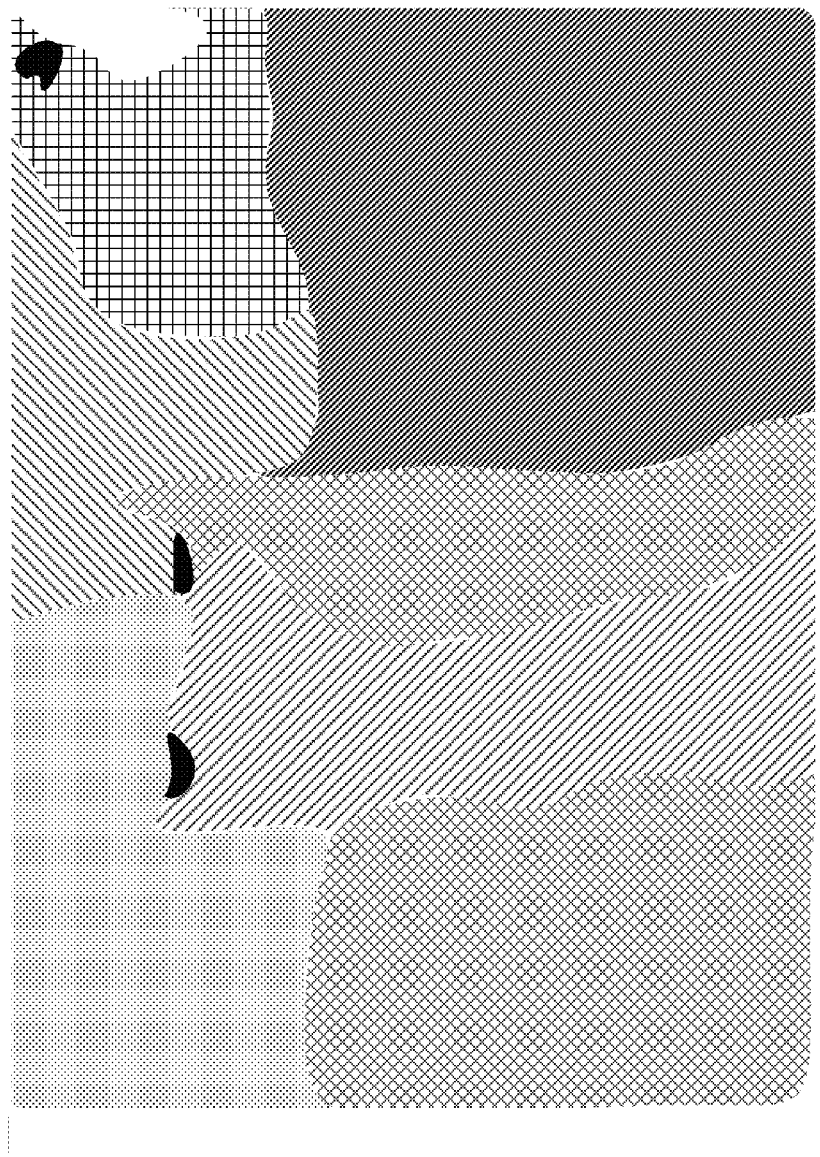
FIG. 8 is a disparity map depicted as an image as used in systems for fusing images from a camera array, according to some embodiments.

FIG. 8 is a disparity map 800 depicted as an image as used in systems for fusing images from a camera array. As an option, the present disparity map 800 may be implemented in the context of the architecture and functionality of the embodiments described herein. Also, the disparity map 800 or any aspect therein may be implemented in any desired environment.

Certain embodiments herein take advantage of color consistency between two given images of the same color (such as G1 and G2), and applies a stereo matching algorithm to compute a disparity map. A disparity map can be understood to be an image, though a disparity map may not be displayed by itself for user viewing. The image of FIG. 8 is merely one example of a generated disparity map from a 2×2 sensor array. Various techniques can be used for stereo matching, a selection of which are presently discussed.

Figure 9:
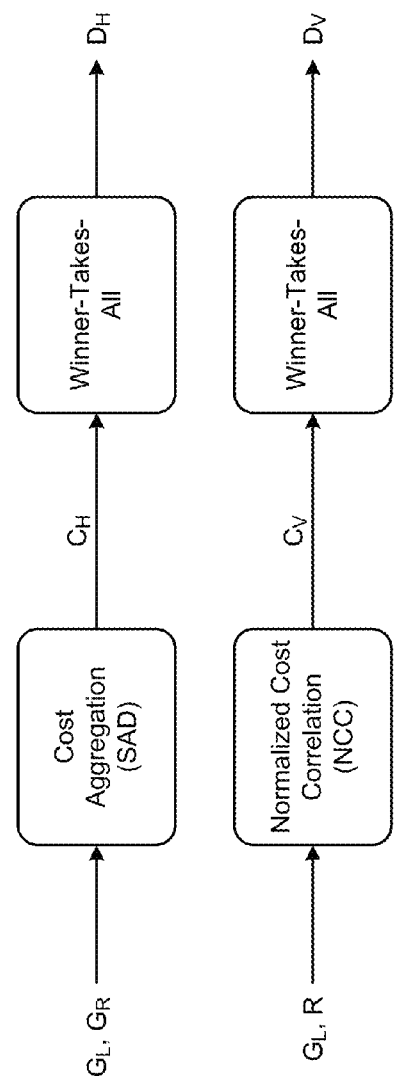
FIG. 9 is a stereo matching process as used in systems for fusing images from a camera array, according to some embodiments.

FIG. 9 is a stereo matching process 900 as used in systems for fusing images from a camera array. As an option, the present stereo matching process 900 may be implemented in the context of the architecture and functionality of the embodiments described herein. Also, the stereo matching process 900 or any aspect therein may be implemented in any desired environment.

The data flow of stereo matching process 900 uses the sum of absolute difference (SAD) and/or normalized cross correlation (NCC) as metrics for matching. Additional algorithmic enhancements can be included, such as reducing the complexity by finding correspondences only along edges.

Local Method

The data flow of stereo matching process 900 is known as a "local method for stereo matching", and includes the following procedures:

Let $\{G_L, G_R, R, B\}$ be rectified images from a given 2×2 array, then compute horizontal and vertical disparity images, $D_H$ and $D_V$. Horizontal matching is performed between the upper left and upper right images of the grid $\{G_L, G_R\}$ using SAD, since it is computationally inexpensive and performs well on images of the same color channel. Vertical matching is performed between the upper left and lower left images $\{G_L, R\}$ using NCC, since NCC is a more robust comparison metric for images of differing color channels.

Notation

W=window size $D_{MIN}$=minimum disparity $D_{MAX}$=maximum disparity

M=image height

N=image width sum(I, i, j, W)=window sum computed using integral image I at location i,j in image with window size W I(d)=image I shifted to the left by d pixels Algorithm Horizontal Stereo Matching—Cost Aggregation (SAD)

```
for d = D_MIN to D_MAX
    compute difference image between green left and
    shifted green right, I_DIFF = |G_L - G_R(d)|
        compute integral image I_d of I_DIFF
for d = D_MIN to D_MAX
    for i = 0 to M
        for j = 0 to N
            C_H(i, j) = sum(I_d, i, j, W)
```

Winner-Takes-All

```
for d = D_MIN to D_MAX
    for i = 0 to M
        for j = 0 to N
            D_H(i, j) = min_d(C_H (i, J))
```

Vertical Stereo Matching—Normalized Cross Correlation (NCC)

```
compute integral image I_RR of squared image R.*R
compute integral image I_GG of squared image G_L.*G_L
for d = D_MIN to D_MAX
    compute integral image I_GR of cross image
    G_L.*R(d)
        for i = 0 to M
            for j = 0 to N
                C_V(i, j) = sum(I_GR, i, j,
    W)/sqrt(sum(I_RR(d), i, j, W)*sum(I_GG, i, j, W))
```

Winner-Takes-All

```
for d = D_MIN to D_MAX
    for i = 0 to M
        for j = 0 to N
            D_V(i, j) = min_d(C_V(i, j))
```

The use of NCC as a similarity metric was motivated by its robustness when matching across color channels, and its performance on noisy images captured by real hardware. Although the metric can be computed using integral image techniques (so its computation time is not dependent on the size of the window), the computation of multiplications, squaring, and square roots is more expensive than the simple absolute difference metric. The metric for computing NCC is as follows:

$$C = \frac{\sum_i L_i \times R_i}{\sqrt{\sum_i L_i^2 \sum_i R_i^2}}$$

where L and R are patches from the left and right images, respectively.

Each summation can be computed using integral image techniques, although the term in the numerator is dependent on the disparity in such a way that an integral image must be computed for this term for each disparity candidate. The L-squared term in the denominator is also dependent on the disparity, but only insomuch as the indexes need to be shifted by the disparity.

The following is a modified version of a local matching method that only searches for matches of pixels neighboring an edge; all other pixel disparities are set to zero:
  Initially, the horizontal and vertical edges in the image are found using an edge detector (e.g., Sobel method).
  The edges are then dilated horizontally or vertically by the maximum disparity value (e.g., about four pixels).
  Stereo matching is performed using only the pixels in the binary masks of the dilated edges.

Global Method

A modified version of the semi-global matching method comprises the following steps:
  Cost computation
    Because of image sampling, exact corresponding of a pixel in a left image to a pixel in a right image doesn't exist. Use interpolation of two pixels for comparison.
    Use intensity and x-derivative for computing cost map.
  Disparity selection
    Global method using Scanline Optimization.
  Disparity refinement
    Incorrect disparity if:
      Cost value is too big.
      Difference between best cost and the others is not big enough.
      Difference between integer disparity and the interpolated one is too big.
    Use median blur for filling some invalid disparities.

Cost Computation

The cost computation is a variation of "Depth Discontinuities by Pixel-to-Pixel Stereo". The cost value contains:
  Pixel intensity
  x-derivative (e.g., using Sobel operator) of pixel Rather than using solely the intensity of a pixel for calculating a cost map, some techniques use a sum including a Sobel value:

$$pixelValue = I(x) + Sobel_{x\text{-}derivative}(x)$$

where:
  I(x) intensity of pixel(x)
  $Sobel_{x\text{-}derivative}(x)$ derivative of pixel(x)

Because of image sampling, it sometime happens that the cost value based on a difference of two corresponding pixels in two images is not exactly correct. For a more accurate result, the dissimilarity based on interpolated values between two pixels is calculated. For example, to compute the dissimilarity between a pixel x in left image and a pixel y in right image, apply the following formula:

$$d(x_i, y_i) = \min(\bar{d}(x_i, y_i, I_L, I_R), \bar{d}(x_i, y_i, I_R, I_L)) \text{ with}$$

$$\bar{d}(x_i, y_i, I_N, I_M) = \min_{y_i - \frac{1}{2} \leq y \leq y_i - \frac{1}{2}} |I_N(x_i) - \hat{I}_M(y)|$$

where:
  $x_i, y_i$ = a position of a pair of pixels on a left image($x_i$) and a right image(y),
  $I_N$ = the intensity of image N, and
  $\hat{I}_M$ = a linear interpolated function between sample points of image M.

The above formula is applied for pairs of pixels (x, y) whose value is preprocessed by summing the intensity with an x-derivative value, y being the position of a pixel in a right image corresponding to a disparity d, y=x−d. After computing the cost value of a pixel, it will be summed with its neighbors' cost value in fixed windows to produce a cost map. This cost map will be input for the disparity selection step.

Disparity Selection

Disparity selection can be used as a global method. Define an energy function E(D) depending from a disparity map D, such as:

$$E(D) = \sum_p (C(p, D_p)) + \sum_{q \in N_0} P_1 T[|(D_p - D_q)| = 1] + \sum_{q \in N_0} P_2 T[|(D_p - D_q)| > 1])$$

where:
  p = a pixel in left image.
  $D_p$ = disparity value at pixel p.
  $C(p, D_p)$ = cost value at pixel p with disparity value $D_p$.
  $N_p$ = set of pixel p's neighbors.
  T = 1 if argument is true; 0 if otherwise.
  $P_1$ = a constant penalty for a neighbor of p which has a small change of disparity; using a small value for an adaption to a slanted or curved surface.
  $P_2$ = a constant penalty for a neighbor of p which has a large change of disparity; using a small value for an adaption to a discontinuous surface.

To find a corresponding disparity map, find a disparity map D to minimize the above energy function E(D). Minimizing E(D) will be reduced to a scanline optimization problem. For example, define a path cost function $L_r(p,d)$ at pixel p and disparity d in which r is a direction vector. Minimizing E(D) is reduced to minimizing the following function S(p,d):

$$S(p, d) = \sum_p L_r(p, d)$$

-continued $$L_r(p, d) = C(p, d) + \min\bigl(L_r(p-r, d), L_r(p-r, d-1) + P_1,$$

$$L_r(p-r, d+1) + P_1, \min_i L_r(p-r, i) + P_2\bigr) - \min_k L_r(p-r, k)$$

where:
- S(p,d)=cost value at pixel p with disparity d. It is computed by summing the path cost from all directions; correct disparity d is the value which makes S(p,d) minimal.
- r=the direction vector.
- $L_r$(p,d)=the path cost at pixel p, in direction r.
- C(p,d)=the cost at pixel p, disparity value d.
- $L_r$(p−r, d)=the path cost of the previous pixel along r direction corresponding to disparity d.
- The disparity value d at pixel p will be computed by minimizing S(p,d).

Disparity Refinement

After computing the disparity value d, the disparity value will be interpolated using a sub-pixel algorithm. First, filter some noise values out of the disparity map. We use the following rules for filtering:
- If the minimal cost value S(p,d) is too great, its disparity value should be set INVALID.
- If the difference (in percent) between the minimal cost value and at least one of the other costs is not greater than a threshold, the disparity value will not be accepted.
- It is possible that the difference of cost values is very small, which is taken to mean that the pixel belongs to a textureless region. Furthermore, such cases don't need an accurate disparity value here, rather just a disparity value that can serve to identify the position of correct color intensity. In this and similar cases, it is reasonable to set the disparity value to zero.
- The above techniques can be used for horizontal disparity maps, and other techniques may be used for non-horizontal (e.g., vertical) disparity maps.
- The disparity can be deemed INVALID if the difference between integer disparity value and interpolate disparity value is greater than a threshold. In some cases of a disparity being deemed INVALID, it is possible to use settings from the camera calibration (see FIG. 15).

Next, processing steps can include using a median blur to fill out some INVALID disparity. Additionally, it is possible to eliminate noisy disparity by setting values to INVALID if its neighbors' disparity is too noisy (e.g., noisy over a threshold).

In certain high-performance situations, in order to save computation time while producing a high-quality disparity map, some embodiments limit operations to search for pixel correspondences to performing correspondence searches only near edges present in the image. An edge as used in this context refers to those areas of the image where sharp changes occur between one particular pixel and a neighboring pixel. Disparity values for areas of the image that are not near edges present in the image can be assigned a zero disparity value (e.g., a value of zero, or predetermined non-zero value to represent actual or imputed zero disparity).

Any of the image processing steps and/or algorithms use can be in various alternative embodiments, and are not required unless as may be required by the claims.

Figure 10:
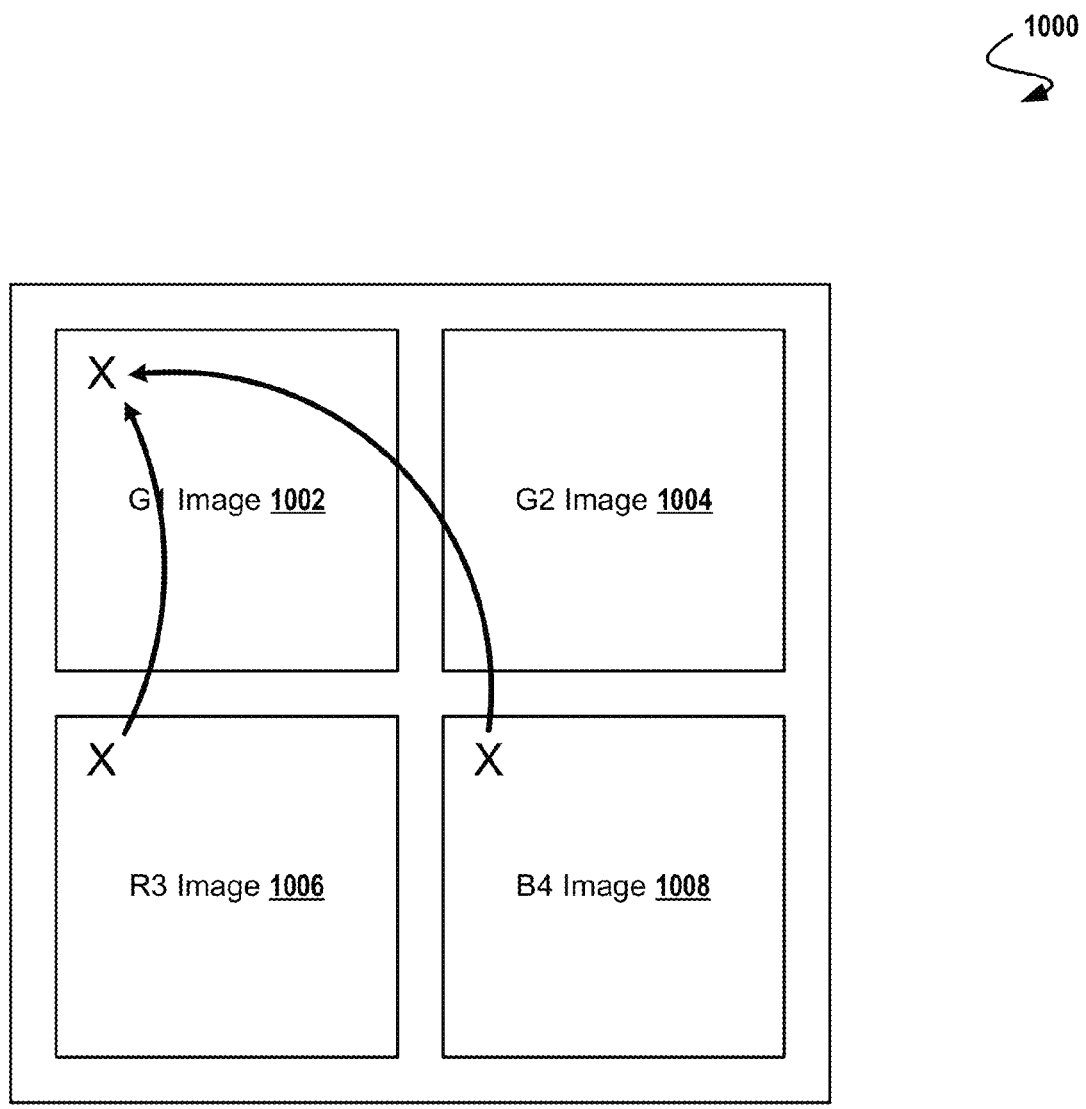
FIG. 10 depicts a warping process as used in systems for fusing images from a camera array, according to some embodiments.

FIG. 10 depicts a warping process 1000 as used in systems for fusing images from a camera array. As an option, the present warping process 1000 may be implemented in the context of the architecture and functionality of the embodiments described herein. Also, the warping process 1000 or any aspect therein may be implemented in any desired environment.

Once the disparity map is computed, warping steps can be used to map pixels from the red (e.g., R3 image 1006) and blue image (e.g., B4 image 1008) to corresponding pixels in the green image (e.g., G1 image 1002), thus eliminating or reducing mismatch from warp.

Strictly as an example for a warp process, let $d_H$ be the horizontal disparity map computed from stereo matching between G1 image 1002 and G2 image 1004.

Then, since:

$$d_H(u, v) = \frac{f_H \times t_H}{z(u, v) \times p}$$

$$d_V(u, v) = \frac{f_V \times t_V}{z(u, v) \times p}$$

where:
- subscript H=horizontal (between a subimage 1 and a subimage 2),
- subscript V=vertical (between a subimage 1 and a subimage 3),
- f=focal length,
- t=distance between two lens,
- p=pixel pitch (distance between consecutive pixels in each camera), and
- (u,v)=image coordinate of a pixel.

Therefore $d_v$, the vertical disparity map (between subimage 1 and subimage 3), can be computed as follows:

$$d_V(u, v) = \frac{f_V \times t_V}{f_H \times t_H} \times d_H(u, v)$$

Then, the warp equations are given as:

$$I_{R1}(u,v)=I_{R2}(u,v-d_v(u,v))$$

$$I_{B1}(u,v)=I_{B4}(u+d_H(u,v),v-d_v(u,v))$$

FIG. 11A, FIG. 11B, and FIG. 11C depict respective images used in a process for removing warp from a warped red subimage 11A00 using a disparity image 11B00 to produce an unwarped subimage 11C00.

As shown, the process performs steps for warping corrections by applying transformations to pixels in the order of from bottom to top and from right to left to reduce warping errors at disoccluded areas. As can be understood, when traversing in the reverse order, pixel b1 1104 will take the value of pixel a3 1110 first, then pixel a3 1110 is marked as 'warped'. Then when pixel a1 1102 looks for value at pixel a3 1110, it is no longer valid. In other terms, if the warp processing order is in the order of top-bottom left-right, pixel a1 1102 will take pixel a3's 1110 value before pixel b1 1104 can take it.

Figure 12A:
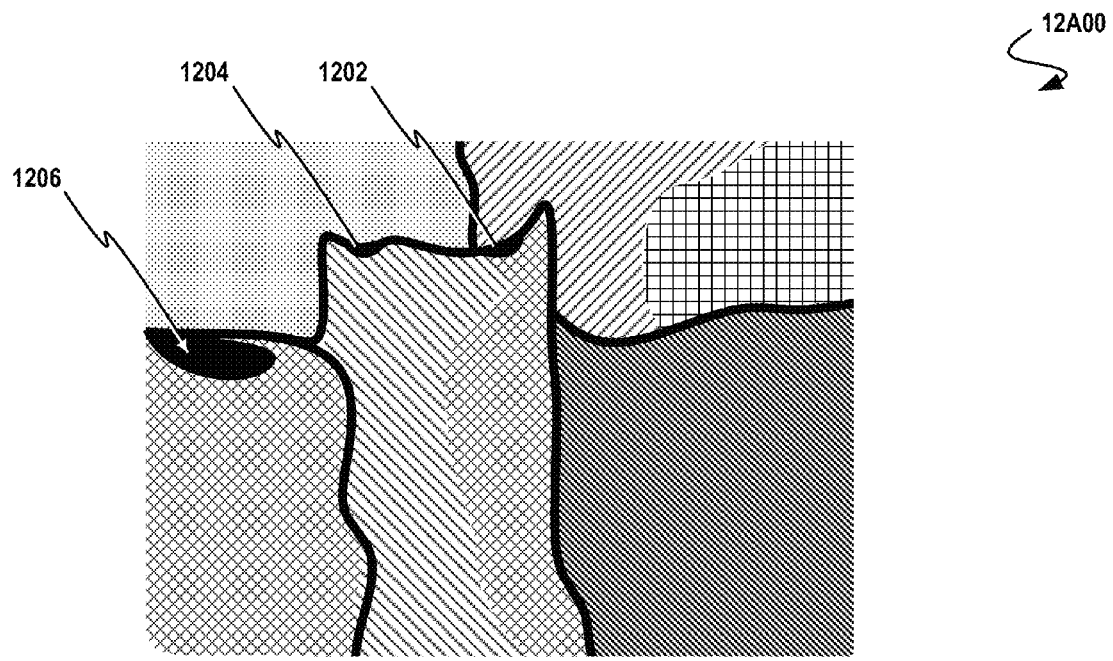
FIG. 12A depicts an unwarped blue subimage with disocclusions as used in systems for fusing images from a camera array, according to some embodiments.

FIG. 12A depicts an unwarped blue subimage 12A00 with disocclusions as used in systems for fusing images from a camera array. As an option, the present unwarped blue subimage 12A00 may be implemented in the context of the architecture and functionality of the embodiments described herein. Also, the unwarped blue subimage 12A00 or any aspect therein may be implemented in any desired environment.

Filling

Since the warping step is not a one-to-one mapping but rather a many-to-one mapping, there are some pixels in the G1 image 1002 image that does not have any mapped pixels from either the R3 image 1006 or the B4 image 1008. This is due to occurrences of disocclusion. The filling step serves to compute values for missing red and blue pixels in the G1 image.

The unwarped blue subimage 12A00 shows disocclusion areas (disocclusion area 1202, disocclusion area 1204, disocclusion area 1206, etc.). The disocclusion areas are filled using any of the techniques presented below.

Figure 12B:
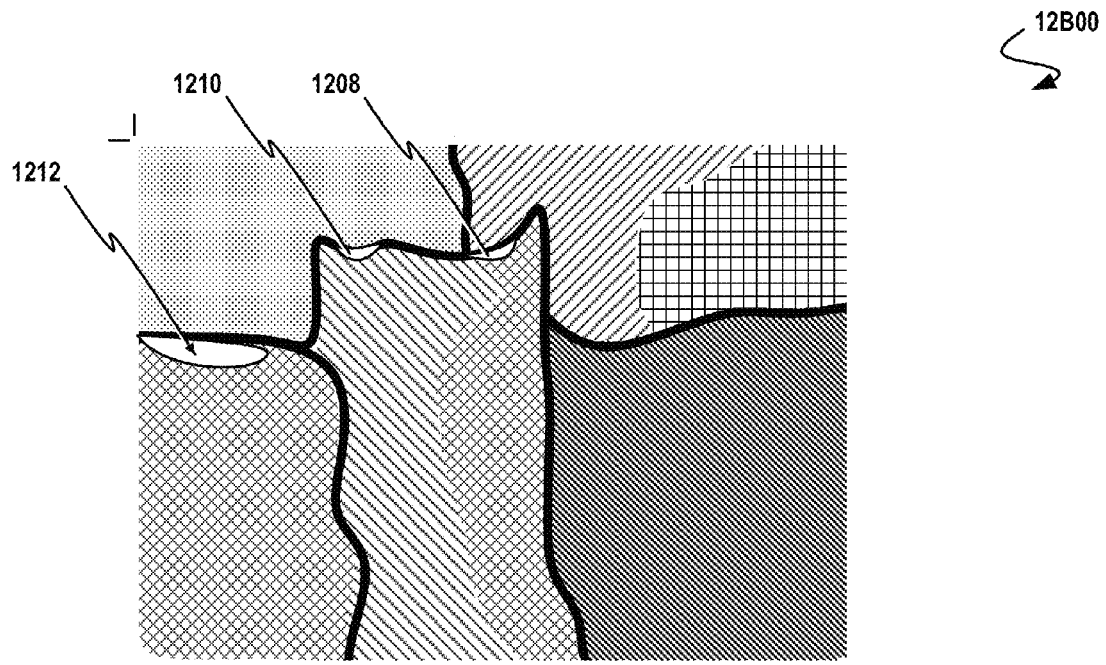
FIG. 12B depicts a warped blue subimage as used in systems for fusing images from a camera array, according to some embodiments.

FIG. 12B depicts a warped blue subimage 12B00 as used in systems for fusing images from a camera array. As an option, the present warped blue subimage 12B00 may be implemented in the context of the architecture and functionality of the embodiments described herein. Also, the warped blue subimage 12B00 or any aspect therein may be implemented in any desired environment.

In order to save computation time while still maintaining good quality, some embodiments apply different filling methods for different sizes of missing areas. For example, one fill method might be used for a relatively larger disocclusion area 1212 while a different fill method might be used for a relatively smaller disocclusion area such as disocclusion area 1210, or disocclusion area 1208 (as shown).

Method 1: Neighbor Fill

Processing proceeds as follows: For each pixel $p_A$ that has a missing red value, check if there is a large enough number of neighbor pixels around $p_A$ that has valid red values (valid pixels), and if so, apply neighbor fill. To do so can include a search for the best candidate whose green value is best matched with that of $p_A$ and copy its red value to $p_A$.

Method 2: Bilateral Fill

If the neighbor fill does not find a large enough number of neighbor pixels around $p_A$, then a bilateral fill can be applied. Bilateral filtering is a non-iterative scheme for edge-preserving smoothing. In exemplary embodiments, bilateral filtering employs a combination of a spatial filter whose weights depend on the Euclidian distance between samples, and a range filter, whose weights depend on differences between values of samples. In this filling step, the difference in green values is used as a range filter. The bilateral fill equation is as follows:

$$I_R(p_A) =$$

$$\frac{1}{W_A} \sum_{B \in N_d(p_A)} G_{\delta_s^2}(|p_A - p_B|) G_{\delta_r^2}(|[I_G(p)]_A - [I_G(p)]_B|) \cdot I_R(p_B) \varphi(p_B)$$

$$W_A = \sum_{B \in N_d(p_A)} G_{\delta_s^2}(|p_A - p_B|) G_{\delta_r^2}(|[I_G(p)]_A - [I_G(p)]_B|) \varphi(p_B)$$

where:

$p_A$=coordinate vector of pixel A.

$I_R(p_A)$=red value of A.

$N_d(p_A)$=d×d neighbor window around A.

$G_{\delta_s^2}$=Gaussian kernel; $\varphi(p_B)$ equals 1 if pixel B has valid red value; otherwise it equals zero.

In certain high-performance situations, the neighbor fill is applied for smaller missing areas (holes) and the more expensive but higher quality method (bilateral fill) is applied for larger holes. Counting the number of valid pixels can be done once and efficiently using an integral image technique. The window size of bilateral fill can be set to equal the maximum disparity value.

Now, returning to the discussion of FIG. 6, in some embodiments, interpolation is applied (e.g., after filling), in advance of edge sharpening. For example some embodiments interpolate an RGB image to a larger size using interpolation techniques. As a specific example, the RGB image can be interpolated to four times larger (twice larger for each dimension) using the bilinear interpolation method. Other interpolation methods are possible and envisioned. However, in some situations the process of interpolation can introduce blurring in the resulting image.

Figure 13B:
FIG. 13B depicts a sharpened subimage as produced by edge sharpening techniques used in systems for fusing images from a camera array, according to some embodiments.
Figure 13A:
FIG. 13A depicts a blurred subimage as blurred by interpolation used in systems for fusing images from a camera array, according to some embodiments.

FIG. 13A depicts a blurred subimage 13A00 as blurred by interpolation used in systems for fusing images from a camera array. As an option, the present blurred subimage 13A00 may be implemented in the context of the architecture and functionality of the embodiments described herein. Also, the blurred subimage 13A00 or any aspect therein may be implemented in any desired environment.

The blurring is particularly noticeable around the edges, for example around the edges of certain characters such as an "M" (e.g., see the "M" in the word "Multiple").

FIG. 13B depicts a sharpened subimage 13B00 as produced by edge sharpening techniques used in systems for fusing images from a camera array. As an option, the present sharpened subimage 13B00 may be implemented in the context of the architecture and functionality of the embodiments described herein. Also, the sharpened subimage 13B00 or any aspect therein may be implemented in any desired environment.

The sharpening of the sharpened subimage 13B00 is particularly noticeable around edges, for example around the edges of certain characters such as an "M".

Strictly as one possibility, the sharpened subimage 13B00 can be produced by applying the following 2D filter to the interpolated image:

$$K = \begin{bmatrix} -0.5 & 0 & -0.5 \\ 0 & 3.0 & 0 \\ -0.5 & 0 & -0.5 \end{bmatrix}$$

Figure 14:
FIG. 14 depicts a composite image generated by fusing images from a camera array, according to some embodiments.

FIG. 14 depicts a composite image 1400 generated by fusing images from a camera array. As an option, the present composite image 1400 may be implemented in the context of the architecture and functionality of the embodiments described herein. Also, the composite image 1400 or any aspect therein may be implemented in any desired environment.

The steps of FIG. 6 and techniques for image processing so far aim to generate a color image (with three full channels R, G, B) from the four captured channel images on the camera array. Additional results from the foregoing processing can include a depth image. A depth image can be generated during the stereo matching step. In certain applications, the depth image can be used as follows:

To apply a user extraction (as the foreground region) algorithm or background subtraction algorithm.

To detect and track certain features of the subject images, for example a hand of a human subject. Such tracking can be used, for example, in a gesture control system. More specifically, when a user gesture spans a plurality of frames (e.g., the hand or finger of a user moves about the image from frame to frame over time) processing one or more of a sequence of images using the generated depth map serves to extract one or more features of the user gesture.

In certain applications, the depth image can be used in combination with a fused multi-channel image to implement gesture detection and tracking and/or any one or more of the operations of FIG. 6.

Figure 15:
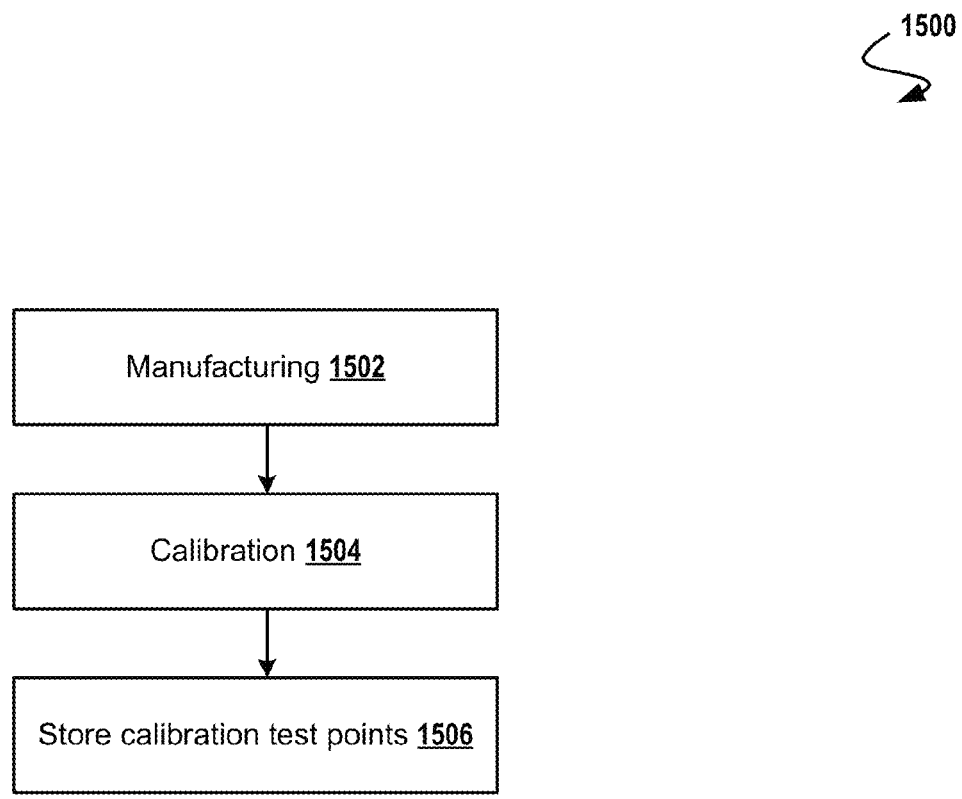
FIG. 15 depicts a manufacturing process for calibrating an apparatus used in fusing images from a camera array, according to some embodiments.

FIG. 15 depicts a manufacturing process 1500 for calibrating an apparatus used in fusing images from a camera array. As an option, the present manufacturing process 1500 may be implemented in the context of the architecture and functionality of the embodiments described herein. Also, the manufacturing process 1500 or any aspect therein may be implemented in any desired environment.

As shown, the manufacturing process comprises the steps of manufacturing the apparatus (see operation 1502), calibrating the apparatus using a known test pattern so as to calibrate variations in the mounting and or variations in the lenses (see operation 1504), and storing the calibration test points (see operation 1506).

Additional Embodiments of the Disclosure

Considering the foregoing, various techniques and selected aspects of any of the embodiments disclosed herein can be combined into additional embodiments. Strictly as examples:

The system is executed in two modes: calibration and operation. The calibration mode is done once at the beginning (e.g. at the camera manufacture) to obtain parameters about the lenses and the placement of the lens array on the image sensor. Once the camera is calibrated, it can be used in the operation mode to efficiently generate depth map and fused image. This efficiency is achieved by the image rectification step that rectifies images captured by lens array so that image rows of horizontal lens pairs are aligned, and image columns of vertical lens pairs are aligned.

Some methods take a plurality of images from a lens array in which there are two lenses of same color or monochrome. The system correlates (e.g., in a "Stereo Matching" step) the pixels in the images obtained by these two lenses to generate a disparity map, which is related to the depth map of the scene, by:

$$d(u, v) = \frac{f \times t}{z(u, v) \times p}$$

where:
d(u,v) and z(u,v)=the disparity values and depth values, respectively, at a pixel (u,v),
f=the lens focal length,
t=the distance between these two lenses, and
p=the distance between consecutive pixels in the camera.

Then, using a depth map z(u,v), the system can infer the disparity maps for images from other lenses and map the pixels in these images into the reference image used for fusion operations to produce a full color image.

In situations when there is ambiguity in stereo matching (e.g., in texture-less regions of image), or in situations where there is a small difference between the best match cost and other costs, the disparity value is set to 0. This has the effect of simplifying the warping in that the warping step can simply copy the pixel of same location; this copy operation does not generate any discrepancy in the fusing image.

A further speedup method in stereo matching can be achieved when the horizontal or vertical stereo matching is computed only around vertical edges or horizontal edges, respectively. Disparity values at other location are simply set to 0.

In one embodiment an alternative disparity calculation method adjusts the estimated disparity map after stereo matching if the disparity values are noisy. This is especially effective in texture-less regions. This alternative disparity calculation can be used effectively prior to warp processing.

Using the following array organization where the lens array is placed in a rectangular grid, an efficient method to convert from vertical disparity to horizontal disparity (and vice versa) can be implemented, based on the following equation:

$$d_V(u, v) = \frac{f_V \times t_V}{f_H \times t_H} \times d_H(u, v)$$

A fast filling operation can be implemented by discriminating small holes to be filled from large holes to be filled. Then, for small holes (e.g., generally in smooth depth regions), any of a variety computationally inexpensive methods such as neighbor fill is used. For large holes (e.g., which are around object boundaries), more elaborate and possibly more computationally expensive methods like bilateral filtering is used.

Figure 16:
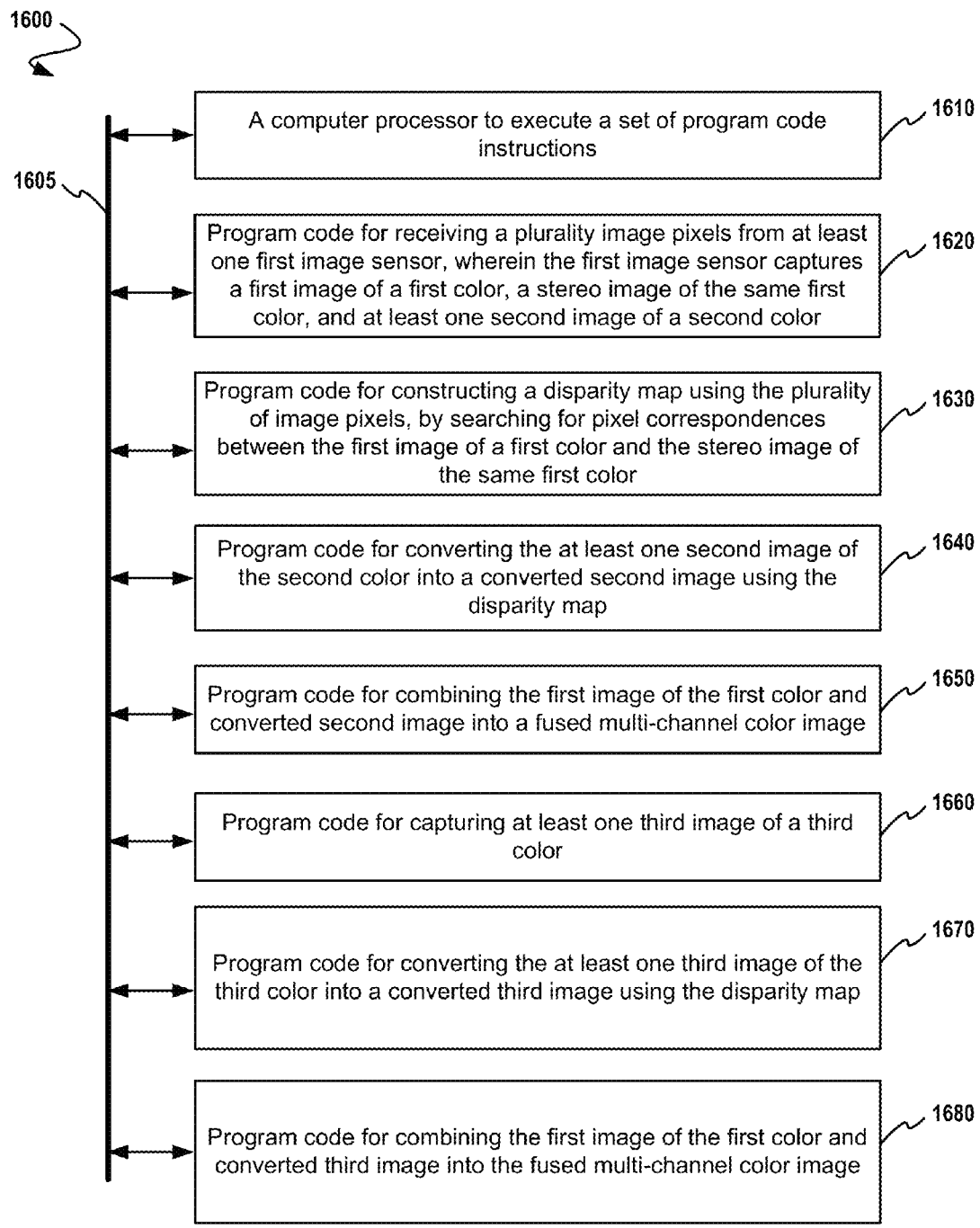
FIG. 16 depicts a block diagram of a system to perform certain functions of a computer system, according to some embodiments.

A depth map can be further processed in combination with full-color fusing image in order to obtain useful information such as a user extraction map and/or user hand/gesture tracking FIG. 16 depicts a block diagram of a system to perform certain functions of a computer system. As an option, the present system 1600 may be implemented in the context of the architecture and functionality of the embodiments described herein. Of course, however, the system 1600 or any operation therein may be carried out in any desired environment. As shown, system 1600 comprises at least one processor and at least one memory, the memory serving to store program instructions corresponding to the operations of the system. As shown, an operation can be implemented in whole or in part using program instructions accessible by a module. The modules are connected to a communication path 1605, and any operation can communicate with other operations over communication path 1605. The modules of the system can, individually or in combination, perform method operations within system 1600. Any operations performed within system 1600 may be performed in any order unless as may be specified in the claims. The embodiment of FIG. 16 implements a portion of a computer system, shown as system 1600, comprising a computer processor to execute a set of program code instructions (see module 1610) and modules for accessing memory to hold program code instructions to perform: receiving a plurality image pixels from at least one first image sensor, where the first image sensor captures a first image of a first color, a stereo image of the same first color, and at least one second image of a second color (see module 1620); constructing a disparity map using the plurality of image pixels, by searching for pixel correspondences between the first image of a first color and the stereo image of the same first color (see module 1630); converting the at least one second image of the second color into a converted second image using the disparity map (see module 1640); and combining the first image of the first color and converted second image into a fused multi-channel color image (see module 1650). Exemplary embodiments further provide program code for capturing at least one third image of a third color (see module 1660); converting the at least one third image of the third color into a converted third image using the disparity map (see module 1670); and combining the first image of the first color and converted third image into the fused multi-channel color image (see module 1680).

System Architecture Overview

Figure 17:
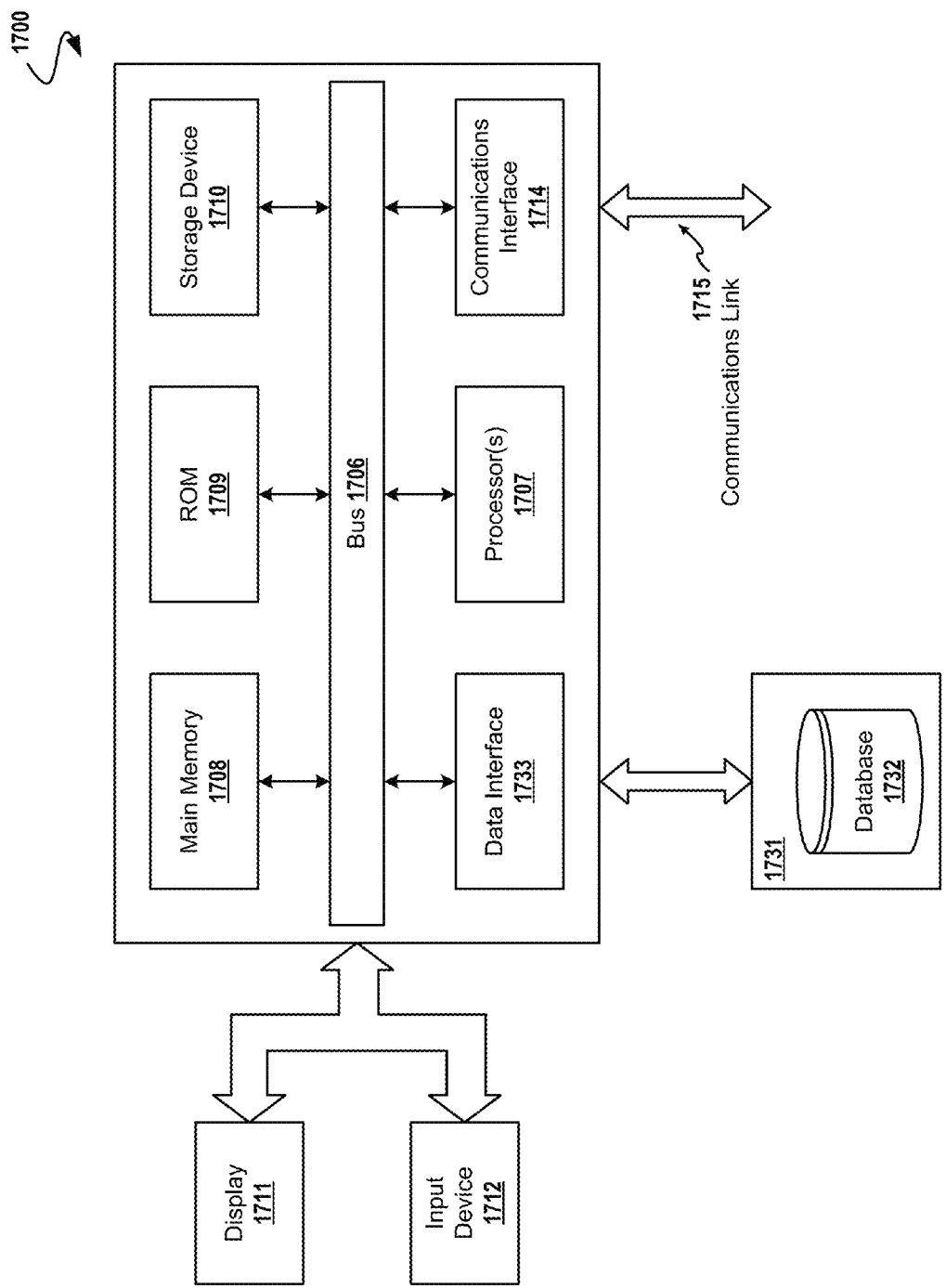
FIG. 17 depicts a block diagram of an instance of a computer system suitable for implementing an embodiment of the present disclosure.

FIG. 17 depicts a block diagram of an instance of a computer system 1700 suitable for implementing an embodiment of the present disclosure. Computer system 1700 includes a bus 1706 or other communication mechanism for communicating information, which interconnects subsystems and devices, such as a processor 1707, a system memory 1708 (e.g., RAM), a static storage device (e.g., ROM 1709), a disk drive 1710 (e.g., magnetic or optical), a data interface 1733, a communication interface 1714 (e.g., modem or Ethernet card), a display 1711 (e.g., CRT or LCD), input devices 1712 (e.g., keyboard, cursor control), and an external data repository 1731.

According to one embodiment of the disclosure, computer system 1700 performs specific operations by processor 1707 executing one or more sequences of one or more instructions contained in system memory 1708. Such instructions may be read into system memory 1708 from another computer readable/usable medium, such as a static storage device or a disk drive 1710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1707 for execution. Such a medium may take many forms, including but not limited to, non-volatile media and volatile media. Non-volatile media includes, for example, optical or magnetic disks, such as disk drive 1710. Volatile media includes dynamic memory, such as system memory 1708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1700. According to certain embodiments of the disclosure, two or more computer systems 1700 coupled by a communications link 1715 (e.g., LAN, PTSN, or wireless network) may perform the sequence of instructions required to practice the disclosure in coordination with one another.

Computer system 1700 may transmit and receive messages, data, and instructions, including programs (e.g., application code), through communications link 1715 and communication interface 1714. Received program code may be executed by processor 1707 as it is received, and/or stored in disk drive 1710 or other non-volatile storage for later execution. Computer system 1700 may communicate through a data interface 1733 to a database 1732 on an external data repository 1731. A module as used herein can be implemented using any mix of any portions of the system memory 1708, and any extent of hard-wired circuitry including hard-wired circuitry embodied as a processor 1707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A method comprising:
obtaining a plurality image pixels from at least one image sensor, wherein the plurality of image pixels comprises:
a first image of a first color,
a second image of the same first color,
a third image of a second color, and
a fourth image of a third color;
constructing a first disparity map using the plurality of image pixels by calculating pixel disparities between the first image and the second image via mono-chromatic stereo matching, the first disparity map being associated with a first direction;
constructing a second disparity map, the second disparity map being associated with a second direction;
warping the third image, along the second direction using the second disparity map, to create a corrected third image;
warping the fourth image, along the first direction using the first disparity map and along the second direction using the second disparity map, to create a corrected fourth image; and
combining the first image, the corrected third image, and the corrected fourth image to create a fused multi-channel color image.

2. The method of claim 1, wherein obtaining the plurality of image pixels comprises:
capturing the first image via a first image sensor;
capturing the second image via a second image sensor;
capturing the third image via a third image sensor; and
capturing the fourth image via a fourth image sensor.

3. The method of claim 1, wherein:
the first image corresponds to a respective first lens;
the second image corresponds to a respective second lens;
the third image corresponds to a respective third lens; and
the fourth image corresponds to a respective fourth lens.

4. The method of claim 2, wherein the first image sensor, the second image sensor, the third image sensor, and the fourth image sensor are organized into a two-by-two sensor array.

5. The method of claim 2, wherein the first image sensor, the second image sensor, the third image sensor, and the fourth image sensor are organized into a floating array.

6. The method of claim 1, wherein constructing the first disparity map comprises performing stereo matching between the first image and the second image by utilizing a sum of absolute differences (SAD) algorithm.

7. The method of claim 1, wherein the pixel correspondences are identified using a plurality of scanline pairs of the first image and the second image.

8. The method of claim 1, wherein the pixel correspondences are identified using a restricted search range.

9. The method of claim 1, further comprising correcting for visual artifacts in the fused multi-channel color image using at least one of, a bilateral filtering technique, and an inpainting technique.

10. The method of claim 1, further comprising generating a depth map using at least one of the disparity maps.

11. The method of claim 10, further comprising using the generated depth map to extract one or more features of a user gesture.

12. An apparatus for fusing images from a camera array, the apparatus comprising:
- a computer processor to execute a set of program code instructions; and
- a memory to hold the program code instructions, in which the program code instructions comprises program code to perform:
  - obtaining a plurality image pixels from at least one image sensor, wherein the plurality of image pixels comprises:
    - a first image of a first color,
    - a second image of the same first color,
    - a third image of a second color, and
    - a fourth image of a third color;
  - constructing a first disparity map using the plurality of image pixels by calculating pixel disparities between the first image and the second image via mono-chromatic stereo matching, the first disparity map being associated with a first direction;
  - constructing a second disparity map, the second disparity map being associated with a second direction;
  - warping the third image, along the second direction using the second disparity map, to create a corrected third image;
  - warping the fourth image, along the first direction using the first disparity map and along the second direction using the second disparity map, to create a corrected fourth image; and
  - combining the first image, the corrected third image, and the corrected fourth image to create a fused multi-channel color image.

13. The apparatus of claim 12, wherein obtaining the plurality of image pixels comprises:
- capturing the first image via a first image sensor;
- capturing the second image via a second image sensor;
- capturing the third image via a third image sensor; and
- capturing the fourth image via a fourth image sensor.

14. The apparatus of claim 13, wherein:
- the first image sensor corresponds to a respective first lens and a first green filter;
- the second image sensor corresponds to a respective second lens and a second green filter;
- the third image sensor corresponds to a respective third lens and a first red filter; and
- the fourth image sensor corresponds to a respective fourth lens and a first blue filter.

15. The method of claim 1, wherein (i) the first color is green, (ii) the second color is red, and (iii) the third color is blue.

16. The method of claim 1, wherein the second direction is perpendicular to the first direction.

17. The method of claim 2, wherein the first direction corresponds to a direction from a center of the first image sensor to a center of the second image sensor and the second direction corresponds to a direction from the center of the first image sensor to a center of the third image sensor.

18. The method of claim 1, wherein obtaining the plurality of image pixels comprises:
- capturing the first image from a first region of a first image sensor;
- capturing the second image from a second region of the first image sensor;
- capturing the third image from a third region of the first image sensor; and
- capturing the fourth image from a fourth region of the first image sensor.

19. The method of claim 1, wherein constructing the second disparity map comprises deriving the second disparity map from the first disparity map.

20. The method of claim 1, wherein constructing the second disparity map comprises performing stereo matching between the first image and the third image by utilizing a normalized cross correlation (NCC) algorithm.

21. The method of claim 10, further comprising using the generated depth map to perform at least one of a user extraction algorithm and a background subtraction algorithm.

22. A method comprising:
- obtaining a plurality image pixels from at least one image sensor, wherein the plurality of image pixels comprises:
  - a first image of a first color, the first image captured at a first location,
  - a second image of the same first color, the second image captured at a second location,
  - a third image of a second color, the third image captured at a third location, and
  - a fourth image of a third color, the fourth image captured at a fourth location which is co-planar with the first, second, and third locations;
- constructing a first disparity map using the plurality of image pixels by calculating pixel disparities between the first image and the second image via mono-chromatic stereo matching, the first disparity map being associated with a direction between the first and second locations;
- constructing a second disparity map, the second disparity map being associated with a direction between the first and third locations;
- warping the third image, using the second disparity map, to create a corrected third image;
- warping the fourth image, using the first and second disparity maps, to create a corrected fourth image; and
- combining the first image, the corrected third image, and the corrected fourth image to create a fused multi-channel color image.

* * * * *